(12) United States Patent
Miyake et al.

(10) Patent No.: US 12,479,786 B2
(45) Date of Patent: Nov. 25, 2025

(54) 11-HALO-1,1-DIALKOXY-7-UNDECENE COMPOUND AND PROCESSES FOR PREPARING A 11,11-DIALKOXY-4-UNDECENYLTRIARYLPHOSPHONIUM HALIDE COMPOUND, A TRIENAL COMPOUND, AND A DIENAL COMPOUND

(71) Applicant: Shin-Etsu Chemical Co., Ltd., Tokyo (JP)

(72) Inventors: Yuki Miyake, Joetsu (JP); Takeshi Kinsho, Joetsu (JP); Yusuke Nagae, Joetsu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 734 days.

(21) Appl. No.: 17/698,022

(22) Filed: Mar. 18, 2022

(65) Prior Publication Data

US 2022/0315513 A1    Oct. 6, 2022

(30) Foreign Application Priority Data

Mar. 23, 2021   (JP) ................. 2021-048537

(51) Int. Cl.
| | | |
|---|---|---|
| C07C 41/54 | (2006.01) | |
| C07C 41/09 | (2006.01) | |
| C07C 43/303 | (2006.01) | |
| C07C 43/313 | (2006.01) | |
| C07F 9/54 | (2006.01) | |

(52) U.S. Cl.
CPC ............. C07C 41/54 (2013.01); C07C 41/09 (2013.01); C07C 43/303 (2013.01); C07C 43/313 (2013.01); C07F 9/5428 (2013.01)

(58) Field of Classification Search
CPC ....... C07C 43/303; C07C 41/54; C07C 41/09; C07C 43/313; C07F 9/5428
See application file for complete search history.

(56) References Cited

U.S. PATENT DOCUMENTS

| | | |
|---|---|---|
| 10,662,166 B2 | 5/2020 | Miyake et al. |
| 2014/0275656 A1 | 9/2014 | Miyake et al. |
| 2019/0367468 A1 | 12/2019 | Miyake et al. |

FOREIGN PATENT DOCUMENTS

| | | |
|---|---|---|
| JP | 2019210217 A | 12/2019 |

OTHER PUBLICATIONS

Michaud, et al., "A New Facile Preparation of a Bifunctionalized C6 Homologating Agent from 1,4-Cyclohexadiene", Tetrahedron 55 (1999) 3019-3024 (Year: 1999).*

Bidd, et al., "Studies on the Synthesis of Linear Aliphatic Compounds. Part. 31 The Synthesis of Paraffins with Very Long Chains", J. Chem. Soc. Perkin. Trans. I, 1987, 2455-2463 (Year: 1987).*

Extended European Search Report corresponding to European Patent Application No. 22163476.9 (8 pages) (dated Aug. 19, 2022).

Michaud et al. "A New Facile Preparation of a Bifunctionalized C6 Homologating Agent from 1,4-Cyclohexadiene" Tetrahedron, 55:3019-3024 (1999).

Leal et al. "Identification, Synthesis, and Field Evaluation of the Sex Pheromone from the Citrus Leafminer, Phyllocnistis citrella" Journal of Chemical Ecology, 32(1):155-168 (2006).

Mafi et al. "Identification of the Sex Pheromone of the Citrus Leafminer (Phyllocnistis citrella Stainton, Lepidoptera: Gracillariidae) with a Trial of Control by the Communication Disruption Method" Journal of Pesticide Science, 30(4):361-367 (2005).

Moreira et al. "Identification, Synthesis, and Field Testing of the Sex Pheromone of the Citrus Leafminer, Phyllocnistis citrella" Journal of Chemical Ecology, 32(1):169-194 (2006).

Office Action with English translation for corresponding Japanese Patent Application No. 2022-039698 (4 pages) (dated Jan. 21, 2025).

* cited by examiner

*Primary Examiner* — Adam C Milligan
(74) *Attorney, Agent, or Firm* — Myers Bigel, P.A.

(57) ABSTRACT

The present invention relates to a process for preparing a (4Z)-11,11-dialkoxy-4-undecenyltriarylphosphonium halide compound of the following general formula (3-Z): wherein Y represents a halogen atom, Ar represents, independently of each other, an aryl group, and $R^1$ and $R^2$ represent, independently of each other, a monovalent hydrocarbon group having 1 to 15 carbon atoms, or $R^1$ and $R^2$ may form together a divalent hydrocarbon group, $R^1$-$R^2$, having 2 to 10 carbon atoms, the process comprising: subjecting a (7Z)-11-halo-1,1-dialkoxy-7-undecene compound of the following general formula (1-Z): wherein $X^1$ represents a halogen atom, and $R^1$ and $R^2$ are as defined above to a phosphonium salt formation reaction with a phosphine compound of the following general formula (2): wherein Ar is as defined above to form the (4Z)-11,11-dialkoxy-4-undecenyltriarylphosphonium halide compound (3-Z).

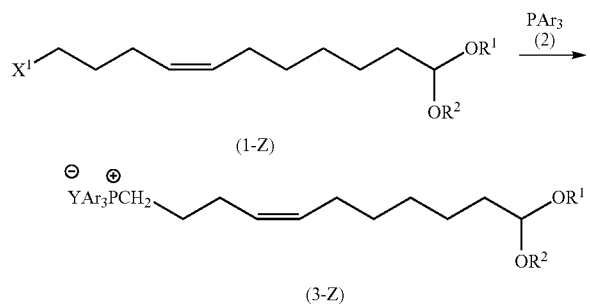

9 Claims, No Drawings

11-HALO-1,1-DIALKOXY-7-UNDECENE COMPOUND AND PROCESSES FOR PREPARING A 11,11-DIALKOXY-4-UNDECENYLTRIARYLPHOSPHONIUM HALIDE COMPOUND, A TRIENAL COMPOUND, AND A DIENAL COMPOUND

TECHNICAL FIELD

The present invention relates to a 11-halo-1,1-dialkoxy-7-undecene compound and processes for preparing a 11,11-dialkoxy-4-undecenyltriarylphosphonium halide compound, a trienal compound, and a dienal compound therefrom.

The present invention relates also to a 11,11-dialkoxy-4-undecenyltriarylphosphonium halide compound and processes for preparing a trienal compound and a dienal compound therefrom.

BACKGROUND ART

Citrus leafminer (*Phyllocnistis citrella*) is one of the most serious pests of citrus, and has spread widely in North, Central, and South America such as the United States, Brazil, and Argentine; Mediterranean countries such as Spain and Italy; Asia such as Japan, Taiwan, Indonesia, Philippines, and India; Oceania such as Australia; Middle Eastern countries such as Saudi Arabia; and Africa such as Tunisia and South Africa. Citrus leafminer infests and damages leaves and greatly affects the growth of young trees and baby trees. Tunnels mined by the pest may cause the development of Citrus canker. Therefore, it is important to control Citrus leafminer. Moreover, Citrus leafminer invades into mesophyll and, therefore, pesticides applied by a typical spray means cannot reach the pest, so that the control of the pest with pesticides is difficult. Owing to the concern about residual pesticides, biological control methods are attracting attention, and utilization of sex pheromone substances is expected as one of them.

The sex pheromone composition of Citrus leafminer is reported to be an aldehyde having 16 carbon atoms, specifically a 3:1 mixture of (7Z,11Z,13E)-7,11,13-hexadecatrienal and (7Z,11Z)-7,11-hexadecadienal in the regions except Japan (Non-Patent Literatures 1 and 2 listed below), and (7Z,11Z)-7,11-hexadecadienal alone in Japan (Non-Patent Literature 3 listed below).

A process for preparing (7Z,11Z,13E)-7,11,13-hexadecatrienal is described in Non-Patent Literature 1 listed below. In the process, the starting material, 2-(5-bromopentyl)-1,3-dioxane, is iodinated with sodium iodide in acetone to form 2-(5-iodopentyl)-1,3-dioxane. Next, 2-(5-iodopentyl)-1,3-dioxane thus obtained is subjected to a coupling reaction with (5-chloro-1-pentyn-1-yl)lithium in hexamethylphosphoric triamide (HMPA) and tetrahydrofuran (THF) to form 2-(10-chloro-6-decyl-1-yl)-1,3-dioxane. Next, 2-(10-chloro-6-decyl-1-yl)-1,3-dioxane thus obtained is reacted with potassium acetate in HMPA to form 10-(1,3-dioxan-2-yl)-4-decynyl acetate. Subsequently, 10-(1,3-dioxan-2-yl)-4-decynyl acetate thus obtained is subjected to a hydrogenation reaction using 5% palladium-barium sulfate as a catalyst and quinoline as a catalyst poison to reduce the carbon-carbon triple bond to a carbon-carbon double bond to form (4Z)-10-(1,3-dioxan-2-yl)-4-decenyl acetate. Next, (4Z)-10-(1,3-dioxan-2-yl)-4-decenyl acetate thus obtained is hydrolyzed with an aqueous solution of potassium hydroxide in methanol to form (4Z)-10-(1,3-dioxan-2-yl)-4-decen-1-ol. The hydroxyl group of (4Z)-10-(1,3-dioxan-2-yl)-4-decen-1-ol thus obtained is oxidized with pyridinium dichromate (PDC) in dichloromethane to form (4Z)-10-(1,3-dioxan-2-yl)-4-decenal. (4Z)-10-(1,3-dioxan-2-yl)-4-decenal thus obtained is subjected to a Wittig reaction, in THF and HMPA, with triphenylphosphonium (2E)-2-pentenylide separately prepared to form 2-(6Z,10Z,12E)-6,10,12-pentadecatrien-1-yl-1,3-dioxane. Subsequently, 2-(6Z,10Z,12E)-6,10,12-pentadecatrien-1-yl-1,3-dioxane thus obtained is reacted with methanol in the presence of p-toluenesulfonic acid to form (3E,5Z,9Z)-16,16-dimethoxy-3,5,9-hexadecatriene. Finally, (3E,5Z,9Z)-16,16-dimethoxy-3,5,9-hexadecatriene thus obtained is hydrolyzed with hydrochloric acid in THF.

Another process for preparing (7Z,11Z,13E)-7,11,13-hexadecatrienal is described in Non-Patent Literature 2 listed below. In the process, the hydroxyl group of the starting material, 3-bromo-1-propanol, is protected to form 1-bromo-3-(tert-butyldimethylsiloxy)propane. Next, tetrahydro-2-(7-octyn-1-yloxy)-2H-pyran separately prepared is reacted with n-butyllithium in THF and then reacted with 1-bromo-3-(tert-butyldimethylsilyloxy)propane obtained above in a mixture of THF and N,N'-dimethylpropylene urea (DMPU) to form 1-(tert-butyldimethylsilyloxy)-11-(tetrahydropyranyloxy)-4-undecyne. The tert-butyldimethylsilyl group of 1-(tert-butyldimethylsilyloxy)-11-(tetrahydropyranyloxy)-4-undecyne thus obtained is removed using tetra-n-butylammonium fluoride (TBAF) in THF and the resulting compound is subjected to a hydrogenation reaction using nickel boride (P-2 Ni) as a catalyst to reduce the carbon-carbon triple bond to a carbon-carbon double bond to form (4Z)-11-(tetrahydropyranyloxy)-4-undecen-1-ol. The hydroxyl group of (4Z)-11-(tetrahydropyranyloxy)-4-undecen-1-ol thus obtained is iodinated with iodine in the presence of imidazole and triphenylphosphine (TPP) in THF, and then reacted with TPP in toluene to form (4Z)-11-(tetrahydropyranyloxy)-4-undecenyltriphenylphosphonium iodide. (4Z)-11-(Tetrahydropyranyloxy)-4-undecenyltriphenylphosphonium iodide thus obtained is reacted with n-butyllithium in DMPU and then subjected to a Wittig reaction with (2E)-2-pentenal to form (7Z,11Z,13E)-1-(tetrahydropyranyloxy)-hexadecatriene. (7Z,11Z,13E)-1-(Tetrahydropyranyloxy)-hexadecatriene thus obtained is reacted with methanol in the presence of p-toluenesulfonic acid to form (7Z,11Z,13E)-7,11,13-hexadecatrienol. Finally, the hydroxyl group of (7Z,11Z,13E)-7,11,13-hexadecatrienol thus obtained is oxidized with pyridinium chlorochromate (PCC).

A process for preparing (7Z,11Z)-7,11-hexadecadienal is described in Non-Patent Literature 1 listed below. In the process, the starting material, 1,3-dibromopropane, is subjected to a coupling reaction with [2-(1,3-dioxan-2-yl)ethyl] magnesium bromide in THF to form 2-(5-bromopentyl)-1,3-dioxane. Next, 2-(5-bromopentyl)-1,3-dioxane thus obtained is reacted with lithium acetylide in HMPA and THF to form 2-(6-heptyn-1-yl)-1,3-dioxane. Next, 2-(6-heptyn-1-yl)-1,3-dioxane thus obtained is reacted with n-butyllithium in THF and then subjected to a coupling reaction with (3Z)-1-bromo-3-octene in HMPA to form 2-[(11Z)-11-hexadecen-7-ynyloxy]tetrahydro-2H-pyran. Subsequently, 2-[(11Z)-11-hexadecen-7-ynyloxy]tetrahydro-2H-pyran thus obtained is subjected to a hydrogenation reaction using 5% palladium-barium sulfate as a catalyst and quinoline as a catalyst poison to reduce the carbon-carbon triple bond to a carbon-carbon double bond to form 2-[(7Z,11Z)-7,11-hexadecadien-1-yloxy]tetrahydro-2H-pyran. 2-[(7Z,11Z)-7,11-hexadecadien-1-yloxy]tetrahydro-2H-pyran thus obtained is reacted with methanol in the presence of p-toluenesulfonic acid to form (5Z,9Z)-16,16-dimethoxy-5,9- hexadecadiene. Finally, (5Z,9Z)-16,16-dimethoxy-5,9-hexadecadiene thus obtained is hydrolyzed with hydrochloric acid in THF.

Another process for preparing (7Z,11Z)-7,11-hexadecadienal is described in Non-Patent Literature 2 listed below. In the process, the starting material, tetrahydro-2-(7-octyn-1-yloxy)-2H-pyran, is reacted with n-butyllithium in THE and then with 1-chloro-3-iodopropane to form 2-[(11-chloro-7-undecyn-1-yl)oxy]tetrahydro-2H-pyran. 2-[(11-chloro-7-undecyn-1-yl)oxy]tetrahydro-2H-pyran thus obtained is iodinated with sodium iodide in acetone to form 2-[(11-iodo-7-undecyn-1-yl)oxy]tetrahydro-2H-pyran. Subsequently, 2-[(11-iodo-7-undecyn-1-yl)oxy]tetrahydro-2H-pyran thus obtained is reacted with TPP in toluene to form 11-(tetrahydropyranyloxy)-4-undecynyltriphenylphosphonium iodide. Next, 11-(tetrahydropyranyloxy)-4-undecynyltriphenylphosphonium iodide thus obtained is reacted with n-butyllithium in DMPU and then subjected to a Wittig reaction with pentanal to form (11Z)-1-(tetrahydropyranyloxy)-hexadecen-7-yne. (11Z)-1-(tetrahydropyranyloxy)-hexadecen-7-yne thus obtained is reacted with methanol in the presence of p-toluenesulfonic acid to form (11Z)-11-hexadecen-7-yn-1-ol. (11Z)-11-hexadecen-7-yn-1-ol thus obtained is subjected to a hydrogenation reaction using nickel boride (P-2 Ni) as a catalyst to reduce the carbon-carbon triple bond to a carbon-carbon double bond to form (7Z,11Z)-7,11-hexadecadienol. Finally, the hydroxyl group of (7Z,11Z)-7,11-hexadecadienol thus obtained is oxidized with pyridinium chlorochromate (PCC) in dichloromethane.

LIST OF THE LITERATURES

Non-Patent Literatures

[Non-Patent Literature 1] Walter S. Leal et al, 2006, J. Chem. Ecol., 32 (1): 155-168.
[Non-Patent Literature 2] Jocelyn G. Millar et al, 2006, J. Chem. Ecol., 32 (1): 169-194.
[Non-Patent Literature 3] T. Ando, J. Pestic. Sci., 30 (4), 2005, 361-367.

Problems to be Solved by the Invention

However, in both of the processes for preparing (7Z,11Z,13E)-7,11,13-hexadecatrienal and (7Z,11Z)-7,11-hexadecadienal described in Non-Patent Literature 1, the carcinogenic hexamethylphosphoric triamide is used as a solvent in a large amount, which prevents the practical application of the processes. n-Butyllithium used in the process described in Non-Patent Literature 1 is difficult to handle because it is sensitive to air and water and may ignite easily on exposure to air. Moreover, an expensive palladium catalyst is used for the hydrogenation reaction in the processes described in Non-Patent Literature 1, making the processes less economically advantageous. Quinoline used as a catalyst poison is recently thought to adversely affects the human body and, therefore, difficult to be used industrially in the processes. In addition, PDC, chromium compound, used in the oxidation reaction in the process for preparing (7Z,11Z,13E)-7,11,13-hexadecatrienal causes extremely high environmental hazard, and, further, the oxidation reaction often involves a danger of explosion. Accordingly, the process is difficult to implement in an industrial scale. Further, the process has a total yield so extremely low as 14% and comprises so many steps as nine. The process for preparing (7Z,11Z)-7,11-hexadecadienal has also a total yield so extremely low as 15% and comprises so many steps as six.

Both of the processes for preparing (7Z,11Z,13E)-7,11,13-hexadecatrienal and (7Z,11Z)-7,11-hexadecadienal described in Non-Patent Literature 2 use n-butyllithium, which is sensitive to air and water, may ignite easily on exposure to air, and is difficult to handle. PCC, chromium compound, is used in the oxidation reaction, which causes extremely high environmental hazard. The oxidation reaction often involves a danger of explosion. Accordingly, the processes are difficult to implement in an industrial scale. In addition, dichloromethane used as a solvent in the processes causes high environmental hazard, and, therefore, is undesirable for environmental protection. The process for preparing (7Z,11Z,13E)-7,11,13-hexadecatrienal has a total yield so extremely low as 7% and comprises so many steps as nine. The process for preparing (7Z,11Z)-7,11-hexadecadienal has a total yield so low as 22% and comprises so many steps as seven.

In addition, the processes for preparing (7Z,11Z,13E)-7,11,13-hexadecatrienal and (7Z,11Z)-7,11-hexadecadienal described in Non-Patent Literatures 1 and 2 have no common synthetic intermediates, and these compounds must be prepared separately. Therefore, these processes are undesirable for preparing the two components of the sex pheromone of Citrus leafminer in view of the economy.

SUMMARY OF THE INVENTION

The present invention has been made in these circumstances, and aims to provide a process for efficiently preparing two components of the sex pheromone of Citrus leafminer from a common synthetic intermediate in less steps.

As a result of the intensive researches to overcome the aforesaid problems of the prior art, the present inventors have found that a (4Z)-11,11-dialkoxy-4-undecenyltriarylphosphonium halide compound is a common synthetic intermediate useful for preparing (7Z,11Z,13E)-7,11,13-hexadecatrienal and (7Z,11Z)-7,11-hexadecadienal, which are the two components of the sex pheromone of Citrus leafminer. The present inventors also have found that (7Z,11Z,13E)-7,11,13-hexadecatrienal and (7Z,11Z)-7,11-hexadecadienal may be prepared from the (4Z)-11,11-dialkoxy-4-undecenyltriarylphosphonium halide compound in a high yield and in less steps, and thus have completed the present invention.

The present inventors also have found that a (7Z)-11-halo-1,1-dialkoxy-7-undecene compound is a synthetic intermediate useful for preparing the (4Z)-11,11-dialkoxy-4-undecenyltriarylphosphonium halide compound which is a common synthetic intermediate for preparing the two components of the sex pheromone, and thus have completed the present invention.

According to a first aspect of the present invention, the present invention provides a process for preparing a (4Z)-11,11-dialkoxy-4-undecenyltriarylphosphonium halide compound of the following general formula (3-Z):

wherein Y represents a halogen atom, Ar represents, independently of each other, an aryl group, and $R^1$ and $R^2$ represent, independently of each other, a monovalent hydrocarbon group having 1 to 15 carbon atoms, or $R^1$ and $R^2$ may form together a divalent hydrocarbon group, $R^1$-$R^2$, having 2 to 10 carbon atoms, the process comprising:

subjecting a (7Z)-11-halo-1,1-dialkoxy-7-undecene compound of the following general formula (1-Z):

(1-Z)

wherein $X^1$ represents a halogen atom, and $R^1$ and $R^2$ are as defined above, to a phosphonium salt formation reaction with a phosphine compound of the following general formula (2):

(2)

wherein Ar is as defined above to form the (4Z)-11,11-dialkoxy-4-undecenyltriarylphosphonium halide compound (3-Z).

According to a second aspect of the present invention, the present invention provides a process for preparing a (3E,5Z,9Z)-16,16-dialkoxy-3,5,9-hexadecatriene compound of the following general formula (6):

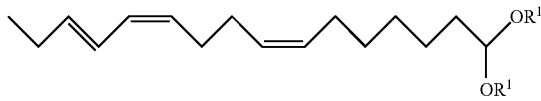

(6)

wherein $R^1$ and $R^2$ are as defined above, the process comprising:

deprotonating a (4Z)-11,11-dialkoxy-4-undecenyltriarylphosphonium halide compound (3-Z) in the presence of a base to form a reaction product mixture, wherein the (4Z)-11,11-dialkoxy-4-undecenyltriarylphosphonium halide compound (3-Z) may be prepared according to the process of the first aspect of the invention for preparing the (4Z)-11,11-dialkoxy-4-undecenyltriarylphosphonium halide compound (3-Z) or according to any other preparation process, and subjecting the reaction product mixture to a Wittig reaction with (2E)-2-pentenal of the following formula (5):

(5)

to form the (3E,5Z,9Z)-16,16-dialkoxy-3,5,9-hexadecatriene compound (6).

According to a third aspect of the present invention, the present invention provides a process for preparing (7Z,11Z,13E)-7,11,13-hexadecatrienal of the following formula (7):

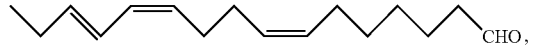

(7)

the process comprising:

the aforesaid process for preparing the (3E,5Z,9Z)-16,16-dialkoxy-3,5,9-hexadecatriene compound (6), and hydrolyzing the (3E,5Z,9Z)-16,16-dialkoxy-3,5,9-hexadecatriene compound (6) to form (7Z,11Z,13E)-7,11,13-hexadecatrienal (7).

According to a fourth aspect of the present invention, the present invention provides a process for preparing a (5Z,9Z)-16,16-dialkoxy-5,9-hexadecadiene compound of the following general formula (9):

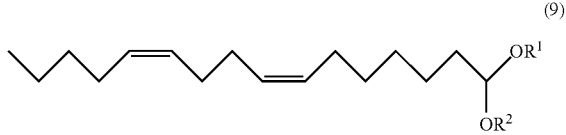

(9)

wherein $R^1$ and $R^2$ are as defined above, the process comprising:

deprotonating a (4Z)-11,11-dialkoxy-4-undecenyltriarylphosphonium halide compound (3-Z) in the presence of a base to form a reaction product mixture, wherein the (4Z)-11,11-dialkoxy-4-undecenyltriarylphosphonium halide compound (3-Z) may be prepared according to the process of the first aspect of the invention for preparing the (4Z)-11,11-dialkoxy-4-undecenyltriarylphosphonium halide compound (3-Z) or according to any other preparation process, and subjecting the reaction product mixture to a Wittig reaction condition with pentanal of the following formula (8):

$$CH_3(CH_2)_3CHO \tag{8}$$

to form the (5Z,9Z)-16,16-dialkoxy-5,9-hexadecadiene compound (9).

According to a fifth aspect of the present invention, the present invention provides a process for preparing (7Z,11Z)-7,11-hexadecadienal of the following formula (10):

(10)

the process comprising:

the aforesaid process for preparing the (5Z,9Z)-16,16-dialkoxy-5,9-hexadecadiene compound (9), and hydrolyzing the (5Z,9Z)-16,16-dialkoxy-5,9-hexadecadiene compound (9) to form (7Z,11Z)-7,11-hexadecadienal (10).

According to a sixth aspect of the present invention, the present invention provides a process for preparing a mixture comprising a (3E,5Z,9Z)-16,16-dialkoxy-3,5,9-hexadecatriene compound of the following general formula (6):

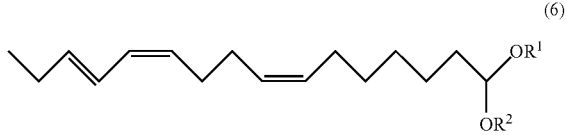

(6)

wherein $R^1$ and $R^2$ are as defined above and a (5Z,9Z)-16,16-dialkoxy-5,9-hexadecadiene compound of the following general formula (9):

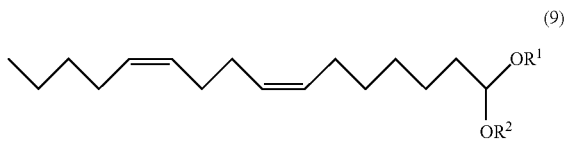
(9)

wherein $R^1$ and $R^2$ are as defined above,
the process comprising:
deprotonating a (4Z)-11,11-dialkoxy-4-undecenyltriarylphosphonium halide compound (3-Z) in the presence of a base to form a reaction product mixture, wherein the (4Z)-11,11-dialkoxy-4-undecenyltriarylphosphonium halide compound (3-Z) may be prepared according to the process of the first aspect of the invention for preparing the (4Z)-11,11-dialkoxy-4-undecenyltriarylphosphonium halide compound (3-Z) or according to any other preparation process, and
subjecting the reaction product mixture to a Wittig reaction with (2E)-2-pentenal of the following formula (5):

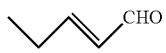
(5)

and with pentanal of the following formula (8):

$$CH_3(CH_2)_3CHO \tag{8}$$

to form the mixture comprising the (3E,5Z,9Z)-16,16-dialkoxy-3,5,9-hexadecatriene compound (6) and the (5Z,9Z)-16,16-dialkoxy-5,9-hexadecadiene compound (9).

According to a seventh aspect of the present invention, the present invention provides a process for preparing a mixture comprising (7Z,11Z,13E)-7,11,13-hexadecatrienal of the following formula (7):

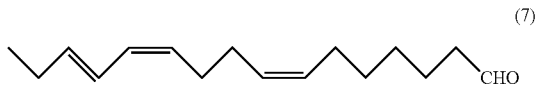 [SMILES: CC/C=C/C=C\CC/C=C\CCCCCC=O]
(7)

and (7Z,11Z)-7,11-hexadecadienal of the following formula (10):

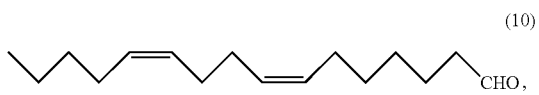
(10)

the process comprising:
the aforesaid process for preparing the mixture comprising the (3E,5Z,9Z)-16,16-dialkoxy-3,5,9-hexadecatriene compound (6) and the (5Z,9Z)-16,16-dialkoxy-5,9-hexadecadiene compound (9), and
subjecting the mixture comprising the (3E,5Z,9Z)-16,16-dialkoxy-3,5,9-hexadecatriene compound (6) and the (5Z,9Z)-16,16-dialkoxy-5,9-hexadecadiene compound (9) to a hydrolysis reaction condition to form a mixture comprising (7Z,11Z,13E)-7,11,13-hexadecatrienal (7) and (7Z,11Z)-7,11-hexadecadienal (10).

According to an eighth aspect of the present invention, the present invention provides a compound of the following general formula (A):

$$L(CH_2)_3CH=CH(CH_2)_5CH(OR^1)(OR^2) \tag{A}$$

wherein $R^1$ and $R^2$ represent, independently of each other, a monovalent hydrocarbon group having 1 to 15 carbon atoms, or $R^1$ and $R^2$ may form together a divalent hydrocarbon group, $R^1$-$R^2$, having 2 to 10 carbon atoms, and L represents $X^1$ or $Y^-Ar_3P^+$, wherein $X^1$ and Y represent a halogen atom, and Ar represents, independently of each other, an aryl group.

When L is $X^1$, the compound is a 11-halo-1,1-dialkoxy-7-undecene compound of the following general formula (1):

$$X^1(CH_2)_3CH=CH(CH_2)_5CH(OR^1)(OR^2) \tag{1}$$

When L is $Y^-Ar_3P^+$, the compound is a 11,11-dialkoxy-4-undecenyltriarylphosphonium halide compound of the following general formula (3):

$$Y^-Ar_3P^+(CH_2)_3CH=CH(CH_2)_5CH(OR^1)(OR^2) \tag{3}$$

According to the present invention, (7Z,11Z,13E)-7,11,13-hexadecatrienal (7), (7Z,11Z)-7,11-hexadecadienal (10), or a mixture thereof are prepared in less steps and in a high yield. According to the present invention, prepared are a 11-halo-1,1-dialkoxy-7-undecene compound (1) and a 11,11-dialkoxy-4-undecenyltriarylphosphonium halide compound (3) which are synthetic intermediates useful for preparing (7Z,11Z,13E)-7,11,13-hexadecatrienal (7) and (7Z,11Z)-7,11-hexadecadienal (10).

DETAILED DESCRIPTION OF THE PREFERRED EMBODIMENTS

A. Compounds of the General Formula (A)
Compounds of the following general formula (A):

$$L(CH_2)_3CH=CH(CH_2)_5CH(OR^1)(OR^2) \tag{A}$$

will be described below.

In the general formula (A), $R^1$ and $R^2$ represent, independently of each other, a monovalent hydrocarbon group having 1 to 15 carbon atoms, or $R^1$ and $R^2$ may form together a divalent hydrocarbon group, $R^1$-$R^2$, having 2 to 10 carbon atoms, and L represents $X^1$ or $Y^-Ar_3P^+$, wherein $X^1$ and Y represent a halogen atom, and Ar represents, independently of each other, an aryl group.

When L in the general formula (A) is $X^1$, the compound (A) is a 11-halo-1,1-dialkoxy-7-undecene compound of the following general formula (1):

$$X^1(CH_2)_3CH=CH(CH_2)_5CH(OR^1)(OR^2) \tag{1}$$

When L in the general formula (A) is $Y^-Ar_3P^+$, the compound (A) is a 11,11-dialkoxy-4-undecenyltriarylphosphonium halide compound of the following general formula (3):

$$Y^-Ar_3P^+(CH_2)_3CH=CH(CH_2)_5CH(OR^1)(OR^2) \tag{3}$$

(A-1). 11-Halo-1,1-dialkoxy-7-undecene Compound (1) and a Process for Preparing the Same
First, a 11-halo-1,1-dialkoxy-7-undecene compound (1) will be described.

$$X^1(CH_2)_3CH=CH(CH_2)_5CH(OR^1)(OR^2) \tag{1}$$

$X^1$ represents a halogen atom as defined for the general formula (A).

Specifically, the halogen atom $X^1$ may be a chlorine atom, a bromine atom, or an iodine atom. A chlorine atom and a bromine atom are preferred in view of the handling.

In the general formula (1), $R^1$ and $R^2$ represent, independently of each other, a monovalent hydrocarbon group having 1 to 15 carbon atoms, preferably 1 to 10 carbon atoms, more preferably 1 to 4 carbon atoms, or $R^1$ and $R^2$ may form together a divalent hydrocarbon group, $R^1$-$R^2$, having 2 to 10 carbon atoms, preferably 2 to 4 carbon atoms.

Examples of the monovalent hydrocarbon group include linear saturated hydrocarbon groups such as a methyl group, an ethyl group, an n-propyl group, an n-butyl group, an n-pentyl group, an n-hexyl group, an n-heptyl group, an n-octyl group, an n-nonyl group, an n-decyl group, an n-undecyl group, and an n-dodecyl group; branched saturated hydrocarbon groups such as an isopropyl group, a 2-isobutyl group, and a 2-methylbutyl group; linear unsaturated hydrocarbon groups such as a 2-propenyl group; branched unsaturated hydrocarbon groups such as a 2-methyl-2-propenyl group; cyclic saturated hydrocarbon groups such as a cyclopropyl group; and isomers thereof. A part of the hydrogen atoms in the hydrocarbon groups may be substituted with a methyl group or an ethyl group.

The monovalent hydrocarbon group is preferably a methyl group, an ethyl group, an n-propyl group, or an n-butyl group in view of the handling.

Examples of the divalent hydrocarbon group include linear saturated hydrocarbon groups such as an ethylene group, a 1,3-propylene group, and a 1,4-butylene group; branched saturated hydrocarbon groups such as a 1,2-propylene group, a 2,2-dimethyl-1,3-propylene group, a 1,2-butylene group, a 1,3-butylene group, a 2,3-butylene group, and a 2,3-dimethyl-2,3-butylene group; linear unsaturated hydrocarbon groups such as a 1-vinylethylene group; branched unsaturated hydrocarbon groups such as a 2-methylene-1,3-propylene group; cyclic hydrocarbon groups such as a 1,2-cyclopropylene group and a 1,2-cyclobutylene group; and isomers thereof. Apart of the hydrogen atoms in the hydrocarbon groups may be substituted with a methyl group or an ethyl group.

The divalent hydrocarbon group is preferably a lower hydrocarbon group preferably having 2 to 4 carbon atoms, because such is easily available and highly reactive in the deprotection, and a by-product formed in the deprotection is easily removed by washing or concentration.

In consideration of these, particularly preferred examples of the bivalent hydrocarbon group include an ethylene group, a 1,3-propylene group, a 1,2-propylene group, a 1,2-butylene group, a 1,3-butylene group, and a 2,3-dimethyl-2,3-butylene group.

The 11-halo-1,1-dialkoxy-7-undecene compound (1) includes a (7Z)-11-halo-1,1-dialkoxy-7-undecene compound of the general formula (1-Z) and a (7E)-11-halo-1,1-dialkoxy-7-undecene compound (1-E).

Specific examples of the (7Z)-11-halo-1,1-dialkoxy-7-undecene compound (1-Z) include the following compounds:

(7Z)-11-chloro-1,1-dialkoxy-7-undecene compounds (1-Z: $X^1$=Cl) such as (7Z)-11-chloro-1,1-dimethoxy-7-undecene, (7Z)-11-chloro-1,1-diethoxy-7-undecene, (7Z)-11-chloro-1,1-dipropyloxy-7-undecene, (7Z)-11-chloro-1,1-dibutyloxy-7-undecene, (7Z)-11-chloro-1,1-dipentyloxy-7-undecene, (7Z)-11-chloro-1,1-dihexyloxy-7-undecene, (7Z)-11-chloro-1,1-diheptyloxy-7-undecene, (7Z)-11-chloro-1,1-dioctyloxy-7-undecene, (7Z)-11-chloro-1,1-dinonyloxy-7-undecene, and (7Z)-11-chloro-1,1-didecyloxy-7-undecene;

(7Z)-11-bromo-1,1-dialkoxy-7-undecene compounds (1-Z: $X^1$=Br) such as (7Z)-11-bromo-1,1-dimethoxy-7-undecene, (7Z)-11-bromo-1,1-diethoxy-7-undecene, (7Z)-11-bromo-1,1-dipropyloxy-7-undecene, (7Z)-11-bromo-1,1-dibutyloxy-7-undecene, (7Z)-11-bromo-1,1-dipentyloxy-7-undecene, (7Z)-11-bromo-1,1-dihexyloxy-7-undecene, (7Z)-11-bromo-1,1-diheptyloxy-7-undecene, (7Z)-11-bromo-1,1-dioctyloxy-7-undecene, (7Z)-11-bromo-1,1-dinonyloxy-7-undecene, and (7Z)-11-bromo-1,1-didecyloxy-7-undecene; and (7Z)-11-iodo-1,1-dialkoxy-7-undecene compounds (1-Z: $X^1$=I) such as (7Z)-11-iodo-1,1-dimethoxy-7-undecene, (7Z)-11-iodo-1,1-diethoxy-7-undecene, (7Z)-11-iodo-1,1-dipropyloxy-7-undecene, (7Z)-11-iodo-1,1-dibutyloxy-7-undecene, (7Z)-11-iodo-1,1-dipentyloxy-7-undecene, (7Z)-11-iodo-1,1-dihexyloxy-7-undecene, (7Z)-11-iodo-1,1-diheptyloxy-7-undecene, (7Z)-11-iodo-1,1-dioctyloxy-7-undecene, (7Z)-11-iodo-1,1-dinonyloxy-7-undecene, and (7Z)-11-iodo-1,1-didecyloxy-7-undecene. 10 [0032]

Specific examples of the (7E)-11-halo-1,1-dialkoxy-7-undecene compound (1-E) include the following compounds:

(7E)-11-chloro-1,1-dialkoxy-7-undecene compounds (1-E: $X^1$=Cl) such as (7E)-11-chloro-1,1-dimethoxy-7-undecene, (7E)-11-chloro-1,1-diethoxy-7-undecene, (7E)-11-chloro-1,1-dipropyloxy-7-undecene, (7E)-11-chloro-1,1-dibutyloxy-7-undecene, (7E)-11-chloro-1,1-dipentyloxy-7-undecene, (7E)-11-chloro-1,1-dihexyloxy-7-undecene, (7E)-11-chloro-1,1-diheptyloxy-7-undecene, (7E)-11-chloro-1,1-dioctyloxy-7-undecene, (7E)-11-chloro-1,1-dinonyloxy-7-undecene, and (7E)-11-chloro-1,1-didecyloxy-7-undecene;

(7E)-11-bromo-1,1-dialkoxy-7-undecene compounds (1-E: $X^1$=Br) such as (7E)-11-bromo-1,1-dimethoxy-7-undecene, (7E)-11-bromo-1,1-diethoxy-7-undecene, (7E)-11-bromo-1,1-dipropyloxy-7-undecene, (7E)-11-bromo-1,1-dibutyloxy-7-undecene, (7E)-11-bromo-1,1-dipentyloxy-7-undecene, (7E)-11-bromo-1,1-dihexyloxy-7-undecene, (7E)-11-bromo-1,1-diheptyloxy-7-undecene, (7E)-11-bromo-1,1-dioctyloxy-7-undecene, (7E)-11-bromo-1,1-dinonyloxy-7-undecene, and (7E)-11-bromo-1,1-didecyloxy-7-undecene; and (7E)-11-iodo-1,1-dialkoxy-7-undecene compounds (1-E: $X^1$=I) such as (7E)-11-iodo-1,1-dimethoxy-7-undecene, (7E)-11-iodo-1,1-diethoxy-7-undecene, (7E)-11-iodo-1,1-dipropyloxy-7-undecene, (7E)-11-iodo-1,1-dibutyloxy-7-undecene, (7E)-11-iodo-1,1-dipentyloxy-7-undecene, (7E)-11-iodo-1,1-dihexyloxy-7-undecene, (7E)-11-iodo-1,1-diheptyloxy-7-undecene, (7E)-11-iodo-1,1-dioctyloxy-7-undecene, (7E)-11-iodo-1,1-dinonyloxy-7-undecene, and (7E)-11-iodo-1,1-didecyloxy-7-undecene.

The 11-halo-1,1-dialkoxy-7-undecene compound (1) is preferably a (7Z)-11-halo-1,1-dialkoxy-7-undecene compound (1-Z), particularly a (7Z)-11-chloro-1,1-dialkoxy-7-undecene compound (1-Z: $X^1$=Cl), a (7Z)-11-bromo-1,1-dialkoxy-7-undecene compound (1-Z: $X^1$=Br), and a (7Z)-11-iodo-1,1-dialkoxy-7-undecene compound (1-Z: $X^1$=I) in view of the preparation of the sex pheromone of Citrus leafminer.

Hereinafter, the (7Z)-11-halo-1,1-dialkoxy-7-undecene compound (1-Z) is taken up to describe a process for preparing the 11-halo-1,1-dialkoxy-7-undecene compound (1). In a case of the (7E)-11-halo-1,1-dialkoxy-7-undecene compound (1-E) instead of the (7Z)-11-halo-1,1-dialkoxy-7-undecene compound (1-Z), the corresponding reactions proceed in a similar manner to form the corresponding compound.

The (7Z)-11-halo-1,1-dialkoxy-7-undecene compound (1-Z) may be prepared, for example, according to the following reaction formulae comprising three steps:

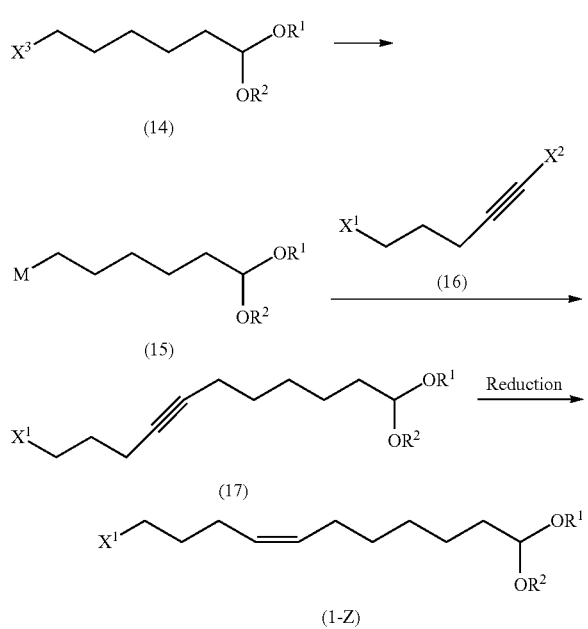

(14)

(15)

(17)

(1-Z)

In the reaction formula, $R^1$, $R^2$, and $X^1$ are as defined for the general formula (1), $X^2$ and $X^3$ represent a halogen atom, and M represents Li or MgZ, wherein Z represents a halogen atom or a 6,6-dialkoxyhexyl group.

First, a 6-halo-1,1-dialkoxyhexane compound of the general formula (14) is reacted with magnesium or lithium in a solvent to prepare 6,6-dialkoxyhexyl nucleophilic reagent of the general formula (15) (first step). The 6,6-dialkoxyhexyl nucleophilic reagent (15) thus prepared is subjected to a coupling reaction with a 1-halo-5-halo-1-pentyne compound of the general formula (16) in the presence of a catalyst, if necessary to prepare a 11-halo-1,1-dialkoxy-7-undecyne compound of the general formula (17) (second step). The carbon-carbon triple bond of the 11-halo-1,1-dialkoxy-7-undecyne compound (17) thus prepared is then reduced to form the target compound, (7Z)-11-halo-1,1-dialkoxy-7-undecene compound (1-Z) (third step).

The process for preparing the (7Z)-11-halo-1,1-dialkoxy-7-undecene compound (1-Z) will be further described in detail below.

The 6-halo-1,1-dialkoxyhexane compound (14) will be described below.

$R^1$ and $R^2$ in the general formula (14) are as defined for the general formula (1).

$X^3$ in the general formula (14) represents a halogen atom. Specifically, the halogen atom $X^3$ is a chlorine atom, a bromine atom, or an iodine atom and is preferably a chlorine atom or a bromine atom in view of the reactivity.

Specific examples of the 6-halo-1,1-dialkoxyhexane compound (14) include the following compounds:

6-chloro-1,1-dialkoxyhexane compounds (14: $X^3$=Cl) such as 6-chloro-1,1-dimethoxyhexane, 6-chloro-1,1-diethoxyhexane, 6-chloro-1,1-dipropyloxy-hexane, 6-chloro-1,1-dibutyloxy-hexane, 6-chloro-1,1-dipentyloxy-hexane, 6-chloro-1,1-dihexyloxy-hexane, 6-chloro-1,1-diheptyloxy-hexane, 6-chloro-1,1-dioctyloxy-hexane, 6-chloro-1,1-dinonyloxy-hexane, and 6-chloro-1,1-didecyloxy-hexane;

6-bromo-1,1-dialkoxyhexane compounds (14: $X^3$=Br) such as 6-bromo-1,1-dimethoxyhexane, 6-bromo-1,1-diethoxyhexane, 6-bromo-1,1-dipropyloxy-hexane, 6-bromo-1,1-dibutyloxy-hexane, 6-bromo-1,1-dipentyloxy-hexane, 6-bromo-1,1-dihexyloxy-hexane, 6-bromo-1,1-diheptyloxy-hexane, 6-bromo-1,1-dioctyloxy-hexane, 6-bromo-1,1-dinonyloxy-hexane, and 6-bromo-1,1-didecyloxy-hexane; and 6-iodo-1,1-dialkoxyhexane compounds (14: $X^3$=I) such as 6-iodo-1,1-dimethoxyhexane, 6-iodo-1,1-diethoxyhexane, 6-iodo-1,1-dipropyloxy-hexane, 6-iodo-1,1-dibutyloxy-hexane, 6-iodo-1,1-dipentyloxy-hexane, 6-iodo-1,1-dihexyloxy-hexane, 6-iodo-1,1-diheptyloxy-hexane, 6-iodo-1,1-dioctyloxy-hexane, 6-iodo-1,1-dinonyloxy-hexane, and 6-iodo-1,1-didecyloxy-hexane.

The 6-halo-1,1-dialkoxyhexane compound (14) is preferably a 6-chloro-1,1-dialkoxyhexane compound (14: $X^3$=Cl) and a 6-bromo-1,1-dialkoxyhexane compound (14: $X^3$=Br) in view of the reactivity.

First Step

A process for preparing a 6,6-dialkoxyhexyl nucleophilic reagent (15) comprises, for example, reacting a 6-halo-1,1-dialkoxyhexane compound (14) with magnesium in a solvent to form a 6,6-dialkoxyhexyl nucleophilic reagent (15: M=MgZ) that is a Grignard reagent (hereinafter also referred to as "Grignard reagent preparation reaction"), as shown in the following chemical reaction formula:

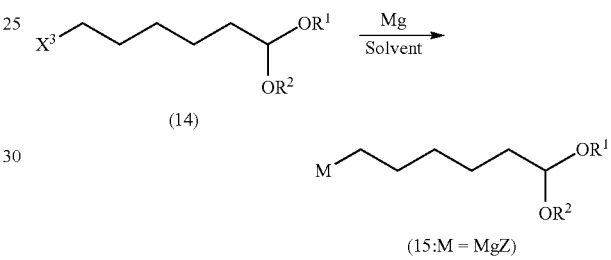

(14)

(15:M = MgZ)

An amount of magnesium to be used in the Grignard reagent preparation reaction is preferably from 1.0 to 2.0 gram atoms, per mol of the 6-halo-1,1-dialkoxyhexane compound (14) in view of the completion of the reaction.

Examples of the solvent used in the Grignard reagent preparation reaction include ethers such as tetrahydrofuran, 2-methyltetrahydrofuran (2-MeTHF), diethyl ether, and 4-methyltetrahydropyran; and hydrocarbons such as toluene, xylene, and hexane. The solvent is preferably an ether such as tetrahydrofuran, 2-methyltetrahydrofuran, diethyl ether, and 4-methyltetrahydropyran, more preferably tetrahydrofuran, and 2-methyltetrahydrofuran, in view of the reaction rate of Grignard reagent preparation.

The solvent may be used either alone or in combination thereof, if necessary. The solvent may be commercially available one.

An amount of the solvent used is preferably from 30 to 5000 g, more preferably from 50 g to 3000 g, per mol of the 6-halo-1,1-dialkoxyhexane compound (14) in view of the reactivity.

A reaction temperature in the Grignard reagent preparation reaction varies, depending on a solvent to be used, and is preferably from 0 to 120° C. in view of the reactivity.

A reaction time of the Grignard reagent preparation reaction varies, depending on a solvent to be used and/or a production scale, and is preferably from 0.5 to 100 hours in view of the reactivity.

Another process for preparing the 6,6-dialkoxyhexyl nucleophilic reagent (15) comprises, for example, reacting a 6-halo-1,1-dialkoxyhexane compound (14) with lithium in a solvent to form a 6,6-dialkoxyhexyl nucleophilic reagent (15: M=Li) that is an organolithium reagent (hereinafter also referred to as "lithium reagent preparation reaction"), as shown in the following chemical reaction formula:

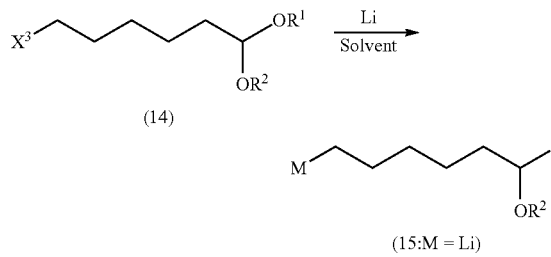

An amount of lithium used in the lithium reagent preparation reaction is preferably from 1.0 to 2.0 gram atoms, per mol of the 6-halo-1,1-dialkoxyhexane compound (14) in view of the completion of the reaction.

Examples of the solvent used in the lithium reagent preparation reaction include ethers such as tetrahydrofuran, 2-methyltetrahydrofuran, diethyl ether, and 4-methyltetrahydropyran; and hydrocarbons such as toluene, xylene, and hexane. The solvent is preferably an ether such as tetrahydrofuran, 2-methyltetrahydrofuran, diethyl ether, or 4-methyltetrahydropyran; or a hydrocarbon such as toluene, xylene, or hexane, and is more preferably tetrahydrofuran, 2-methyltetrahydrofuran, toluene, or hexane, in view of the reaction rate of lithium reagent preparation.

The solvent may be used either alone or in combination thereof, if necessary. The solvent may be commercially available one.

An amount of the solvent used is preferably from 30 to 5000 g, more preferably from 50 g to 3000 g, per mol of the 6-halo-1,1-dialkoxyhexane compound (14), in view of the reactivity.

A reaction temperature in the lithium reagent preparation reaction varies, depending on a solvent to be used, and is preferably from −40 to 120° C. in view of the reactivity.

A reaction time in the lithium reagent preparation reaction varies, depending on a solvent to be used and/or a production scale, and is preferably from 0.5 to 100 hours in view of the reactivity.

The 6,6-dialkoxyhexyl nucleophilic reagent (15) will be described below.

$R^1$ and $R^2$ in the general formula (15) are as defined for the general formula (1).

M in the general formula (15) represents Li or MgZ, wherein Z represents a halogen atom or a 6,6-dialkoxyhexyl group. Specifically, the halogen atom Z is a chlorine atom, a bromine atom, or an iodine atom, and is preferably a chlorine atom or a bromine atom, more preferably a chlorine atom, in view of the reactivity.

The 6,6-dialkoxyhexyl nucleophilic reagent (15) includes a 6,6-dialkoxyhexylmagnesium halide compound (15: M=MgZ, Z=halogen atom) and a bis(6,6-dialkoxyhexyl)magnesium compound (15: M=MgZ, Z=6,6-dialkoxyhexyl group).

Specific examples of the 6,6-dialkoxyhexylmagnesium halide compound (15: M=MgZ, Z=halogen atom) include the following compounds:

6,6-dialkoxyhexyllithium compounds (15: M=Li) such as 6,6-dimethoxyhexyllithium, 6,6-diethoxyhexyllithium, 6,6-dipropyloxy-hexyllithium, 6,6-dibutyloxy-hexyllithium, 6,6-dipentyloxy-hexyllithium, 6,6-dihexyloxy-hexyllithium, 6,6-diheptyloxy-hexyllithium, 6,6-dioctyloxy-hexyllithium, 6,6-dinonyloxy-hexyllithium, and 6,6-didecyloxy-hexyllithium;

6,6-dialkoxyhexylmagnesium chloride compounds (15: M=MgZ, Z=chlorine atom) such as 6,6-dimethoxyhexylmagnesium chloride, 6,6-diethoxyhexylmagnesium chloride, 6,6-dipropyloxyhexylmagnesium chloride, 6,6-dibutyloxyhexylmagnesium chloride, 6,6-dipentyloxyhexylmagnesium chloride, 6,6-dihexyloxyhexylmagnesium chloride, 6,6-diheptyloxyhexylmagnesium chloride, 6,6-dioctyloxyhexylmagnesium chloride, 6,6-dinonyloxyhexylmagnesium chloride, and 6,6-didecyloxyhexylmagnesium chloride;

6,6-dialkoxyhexylmagnesium bromide compounds (15: M=MgZ, Z=bromine atom) such as 6,6-dimethoxyhexylmagnesium bromide, 6,6-diethoxyhexylmagnesium bromide, 6,6-dipropyloxyhexylmagnesium bromide, 6,6-dibutyloxyhexylmagnesium bromide, 6,6-dipentyloxyhexylmagnesium bromide, 6,6-dihexyloxyhexylmagnesium bromide, 6,6-diheptyloxyhexylmagnesium bromide, 6,6-dioctyloxyhexylmagnesium bromide, 6,6-dinonyloxyhexylmagnesium bromide, and 6,6-didecyloxyhexylmagnesium bromide; and 6,6-dialkoxyhexylmagnesium iodide compounds (15: M=MgZ, Z=iodine atom) such as 6,6-dimethoxyhexylmagnesium iodide, 6,6-diethoxyhexylmagnesium iodide, 6,6-dipropyloxyhexylmagnesium iodide, 6,6-dibutyloxyhexylmagnesium iodide, 6,6-dipentyloxyhexylmagnesium iodide, 6,6-dihexyloxyhexylmagnesium iodide, 6,6-diheptyloxyhexylmagnesium iodide, 6,6-dioctyloxyhexylmagnesium iodide, 6,6-dinonyloxyhexylmagnesium iodide, and 6,6-didecyloxyhexylmagnesium iodide.

Specific examples of the bis(6,6-dialkoxyhexyl)magnesium compound (15: M=MgZ, Z=6,6-dialkoxyhexyl group) include bis(6,6-dimethoxyhexyl)magnesium, bis(6,6-diethoxyhexyl)magnesium, bis(6,6-dipropoxyhexyl)magnesium, bis(6,6-dibutyloxyhexyl)magnesium, bis(6,6-dipentyloxyhexyl)magnesium, bis(6,6-dihexyloxyhexyl)magnesium, bis(6,6-diheptyloxyhexyl)magnesium, bis(6,6-dioctyloxyhexyl)magnesium, bis(6,6-dinonyloxyhexyl)magnesium, and bis(6,6-didecyloxyhexyl)magnesium.

The 6,6-dialkoxyhexyl nucleophilic reagent (15) is preferably a 6,6-dialkoxyhexylmagnesium halide compound (15: M=MgZ, Z=halogen atom) such as a 6,6-dialkoxyhexylmagnesium chloride compound (15: M=MgZ, Z=chlorine atom), in view of easy preparation.

The 6,6-dialkoxyhexyl nucleophilic reagent (15) may be used either alone or in combination thereof, if necessary.

The 6,6-dialkoxyhexyl nucleophilic reagent (15) may be commercially available one or may be prepared in house.

The 1-halo-5-halo-1-pentyne compound (16) will be described below.

In the general formula (16), $X^1$ is as defined for the general formula (1), and $X^2$ is a halogen atom. Specifically, the halogen atom $X^2$ is a chlorine atom, a bromine atom, or an iodine atom and, preferably a bromine atom or an iodine atom in view of the reactivity.

Specific examples of the 1-halo-5-halo-1-pentyne compound (16) include the following compounds:
1-chloro-5-halo-1-pentyne compounds (16: $X^2$=chlorine atom) such as 1-chloro-5-chloro-1-pentyne, 1-chloro-5-bromo-1-pentyne, and 1-chloro-5-iodo-1-pentyne;
1-bromo-5-halo-1-pentyne compounds (16: $X^2$=bromine atom) such as 1-bromo-5-chloro-1-pentyne, 1-bromo-5-bromo-1-pentyne, and 1-bromo-5-iodo-1-pentyne; and 1-iodo-5-halo-1-pentyne compounds (16: $X^2$=iodine atom) such as 1-iodo-5-chloro-1-pentyne, 1-iodo-5-bromo-1-pentyne, and 1-iodo-5-iodo-1-pentyne.

The 1-halo-5-halo-1-pentyne compound (16) is preferably a 1-bromo-5-halo-1-pentyne compound (16: $X^2$=bromine atom) such as 1-bromo-5-chloro-1-pentyne, in view of easy preparation.

The 1-halo-5-halo-1-pentyne compound (16) may be used either alone or in combination thereof, if necessary.

The 1-halo-5-halo-1-pentyne compound (16) may be commercially available one or may be prepared in house.

The coupling reaction may be carried out in a solvent, if necessary. Examples of the solvent include common solvents, for example, ethers such as diethyl ether, dibutyl ether, 4-methyltetrahydropyran, tetrahydrofuran (THF), 2-methyltetrahydrofuran, cyclopentylmethylether, and 1,4-dioxane; hydrocarbons such as hexane, heptane, benzene, toluene, xylene, and cumene; chlorinated solvents such as trichloroethylene, dichloromethane, and chloroform; aprotic polar solvents such as dimethyl sulfoxide, γ-butyrolactone (GBL), N-methylpyrrolidone (NMP), N,N-dimethylformamide (DMF), N,N-dimethylacetamide (DMAC), and hexamethylphosphoric triamide (HMPA); and nitriles such as acetonitrile and propionitrile. The solvent is preferably toluene, xylene, tetrahydrofuran, 2-methyltetrahydrofuran, 4-methyltetrahydropyran, or acetonitrile, more preferably tetrahydrofuran, 2-methyltetrahydrofuran, in view of the reactivity.

The solvent may be used either alone or in combination thereof, if necessary. The solvent may be commercially available one.

An amount of the solvent used is preferably from 30 to 8000 g, more preferably from 50 to 5000 g, per mol of the 1-halo-5-halo-1-pentyne compound (16) in view of the reactivity.

Second Step

The coupling reaction between the 6,6-dialkoxyhexyl nucleophilic reagent (15) and the 1-halo-5-halo-1-pentyne compound (16) may be carried out in the presence of a catalyst, if necessary.

Examples of the catalyst include copper compounds including cuprous halides such as cuprous chloride, cuprous bromide, and cuprous iodide; and cupric halides such as cupric chloride, cupric bromide, and cupric iodide; iron compounds such as iron (II) chloride, iron (III) chloride, iron (II) bromide, iron (III) bromide, iron (II) iodide, iron (III) iodide, and iron (III) acetylacetonate; silver compounds such as silver chloride, silver nitrate, and silver acetate; titanium compounds such as titanium tetrachloride, titanium tetrabromide, titanium (IV) methoxide, titanium (IV) ethoxide, titanium (IV) isopropoxide, and titanium (IV) oxide; palladium (II) compounds such as dichlorobis(triphenylphosphine)palladium and dichloro[1,1'-bis(diphenylphosphino)ferrocene]palladium; and nickel compounds such as nickel chloride, dichloro[1,2-bis(diphenylphosphino)ethane]nickel (II), and dichlorobis(triphenylphosphine)nickel (II). When the 6,6-dialkoxyhexyl nucleophilic reagent (15) is the Grignard reagent, i.e., a 6,6-dialkoxyhexylmagnesium halide compound (15: M=MgZ), the catalyst is preferably a copper compound, more preferably a cupric halide such as cupric chloride, cupric bromide, or cupric iodide, in view of the reactivity and/or economy.

The catalyst may be used either alone or in combination thereof, if necessary. The catalyst may be commercially available one.

An amount of the catalyst used is preferably from 0.0003 to 0.500 mol, more preferably from 0.003 to 0.200 mol, per mol of the 1-halo-5-halo-1-pentyne compound (16) in view of the reaction rate and post-treatments.

When the coupling reaction is carried out in the presence of a catalyst, a co-catalyst may be used, if necessary. Examples of the co-catalyst include trialkyl phosphite compounds having 3 to 9 carbon atoms such as triethyl phosphite; and arylphosphine compounds having 18 to 44 carbon atoms such as triphenylphosphine, tritolylphosphine, and 2,2'-bis(diphenylphosphino)-1,1'-binaphthyl (BINAP). Trialkyl phosphite is preferred, and triethyl phosphite is particularly preferred, in view of the reactivity.

The co-catalyst may be used either alone or in combination thereof, if necessary. The co-catalyst may be commercially available one.

An amount of the co-catalyst used is preferably from 0.0001 to 1.00 mol, more preferably from 0.001 to 0.300 mol, per mol of the 1-halo-5-halo-1-pentyne compound (16).

When an organolithium reagent is used in the coupling reaction, N,N,N',N'-tetramethylethylenediamine (TMEDA), hexamethylphosphoric triamide (THMPA), or N,N'-dimethylpropylene urea (DMPU) may be added to improve a reaction rate, if necessary.

When the coupling reaction is carried out in the presence of a catalyst, a lithium salt may be added, if necessary. Examples of the lithium salt include lithium halides such as lithium chloride, lithium bromide, and lithium iodide; lithium nitrate; and lithium carbonate. Lithium halides such as lithium chloride and lithium nitrate are preferred in view of the reactivity.

The lithium salt may be used either alone or in combination thereof, if necessary. The lithium salt may be commercially available one.

An amount of the lithium salt used in the coupling reaction is preferably from 0.0001 to 1.00 mol, more preferably from 0.001 to 0.300 mol, per mol of the 1-halo-5-halo-1-pentyne compound (16) in view of the reactivity.

A reaction temperature in the coupling reaction varies, depending on a 6,6-dialkoxyhexyl nucleophilic reagent (15) to be used, and is preferably from −78 to 100° C., more preferably from −25 to 60° C., in view of the reactivity.

A reaction time in the coupling reaction varies, depending on a solvent to be used and/or a production scale, and is preferably from 0.5 to 100 hours in view of the reactivity.

The 11-halo-1,1-dialkoxy-7-undecyne compound (17) will be described below.

$X^1$, $R^1$, and $R^2$ in the general formula (17) are as defined for the general formula (1).

Specific examples of the 11-halo-1,1-dialkoxy-7-undecyne compound (17) include the following compounds:

11-chloro-1,1-dialkoxy-7-undecyne compounds (17: $X^1$=chlorine atom) such as 11-chloro-1,1-dimethoxy-7-undecyne, 11-chloro-1,1-diethoxy-7-undecyne, 11-chloro-1,1-dipropyloxy-7-undecyne, 11-chloro-1,1-dibutyloxy-7-undecyne, 11-chloro-1,1-dipentyloxy-7-undecyne, 11-chloro-1,1-dihexyloxy-7-undecyne, 11-chloro-1,1-diheptyloxy-7-undecyne, 11-chloro-1,1-dioctyloxy-7-undecyne, 11-chloro-1,1-dinonyloxy-7-undecyne, and 11-chloro-1,1-didecyloxy-7-undecyne;

11-bromo-1,1-dialkoxy-7-undecyne compounds (17: $X^1$=bromine atom) such as 11-bromo-1,1-dimethoxy-7-undecyne, 11-bromo-1,1-diethoxy-7-undecyne, 11-bromo-1,1-dipropyloxy-7-undecyne, 11-bromo-1,1-dibutyloxy-7-undecyne, 11-bromo-1,1-dipentyloxy-7-undecyne, 11-bromo-1,1-dihexyloxy-7-undecyne, 11-bromo-1,1-diheptyloxy-7-undecyne, 11-bromo-1,1-dioctyloxy-7-undecyne, 11-bromo-1,1-dinonyloxy-7-undecyne, and 11-bromo-1,1-didecyloxy-7-undecyne; and 11-iodo-1,1-dialkoxy-7-undecyne compounds (17: $X^1$=iodine atom) such as 11-iodo-1,1-dimethoxy-7-undecyne, 11-iodo-1,1-diethoxy-7-undecyne, 11-iodo-1,1-dipropyloxy-7-undecyne, 11-iodo-1,1-dibutyloxy-7-undecyne, 11-iodo-1,1-dipentyloxy-7-undecyne, 11-iodo-1,1-dihexyloxy-7-undecyne, 11-iodo-1,1-diheptyloxy-7-undecyne, 11-iodo-1,1-dioctyloxy-7-undecyne, 11-iodo-1,1-dinonyloxy-7-undecyne, and 11-iodo-1,1-didecyloxy-7-undecyne.

Third Step

Examples of the reduction reaction in which the carbon-carbon triple bond of the 11-halo-1,1-dialkoxy-7-undecyne compound (17) is reduced to form the (7Z)-11-halo-1,1-dialkoxy-7-undecene compound (1-Z) is preferably (i) a catalytic hydrogenation reaction, (ii) a reduction reaction with zinc in an alcohol solvent, (iii) reduction by hydroboration with a dialkylborane, followed by protonation, (iv) a reduction reaction using potassium hydroxide and N,N-dimethylformamide (DMF) in the presence of a palladium catalyst such as palladium acetate, (v) reduction by hydrosilylation for obtaining a vinylsilane, followed by desilylation, (vi) Birch reduction, (vii) ammonia-free Birch reduction, or (viii) Benkeser reduction. In view of the selectivity and productivity, (i) the catalytic hydrogenation reaction, (ii) the reduction reaction with zinc, or (iii) the reduction by hydroboration with a dialkylborane, followed by protonation are preferred, more preferably (i) the catalytic hydrogenation reaction.

The reduction reaction in which the carbon-carbon triple bond of the 11-halo-1,1-dialkoxy-7-undecyne compound (17) is reduced to form the (7E)-11-halo-1,1-dialkoxy-7-undecene compound (1-E) is preferably conducted by (vi) Birch reduction, (vii) ammonia-free Birch reduction, or (viii) Benkeser reduction, most preferably (viii) Benkeser reduction, among the reduction by (i) to (viii), in view of easy preparation.

(i) Catalytic Hydrogenation Reaction

The catalytic hydrogenation reaction is carried out with a hydrogen gas in the presence of a metal catalyst.

Examples of the metal catalyst used in the catalytic hydrogenation reaction include, but not limited to, nickel catalysts such as a nickel boride catalyst; nickel (0) nanoparticles (Francisco Alonso et al, Tetrahedron, 2007, 63, 93-102), and Urushibara nickel (for example, U-Ni-A and U-Ni-B); and palladium catalysts such as Lindlar catalyst and palladium on carbon Pd/CaCO$_3$, Pd/BaSO$_4$, Pd/Al$_2$O$_3$, Pd/SiO$_2$ doped with Hg, Pd/MCM-41, Pd nanoparticles in hydrotalcite, Pd/Zn alloy, and Pd-PEI which is palladium on carbon, poisoned with polyethylenimine polymer (PEI). Examples of the nickel boride catalyst include, but not limited to, a P-1 nickel boride catalyst and a P-2 nickel boride catalyst (Thomas J. Caggiano et al. Encyclopedia of Reagents for Organic Synthesis: 3694-3699.) (hereinafter also referred to as "P-2 Ni catalyst"); and a dispersed nickel on graphite (such as Ni-Gr1 and Ni-Gr2), a Caubere catalyst (Nic), and a nickel on borohydride exchange resin (Ni$_2$B-BER) (Laurence Balas, H A L, 2021; https.//hal.archives-ouvertes.fr/hal-00801666). The Lindlar catalyst and the nickel catalysts are preferred in view of the economy.

An amount of the metal catalyst used varies, depending on a catalyst to be used, and is preferably from 0.01 to 50 g, per mol of the 11-halo-1,1-dialkoxy-7-undecyne compound (17) in view of the reactivity when a solid catalyst such as the Lindlar catalyst is used. P-2 Ni catalyst is preferably used in an amount equivalent to 0.0001 to 2.0 mol of a nickel compound, per mol of the 11-halo-1,1-dialkoxy-7-undecyne compound (17).

A solid catalyst may be dispersed in a solvent.

When the metal catalyst has high activity, a catalyst poison may be used, if necessary.

Examples of the catalyst poison include amine compounds such as pyridine, quinoline, and ethylenediamine; phosphine compounds such as triphenylphosphine, tri-tolylphosphine, and triethyl phosphite; and sulfur compounds such as benzenethiol, diphenyl sulfide, dimethyl sulfide, and dimethyl sulfoxide.

An amount of the catalyst poison used varies, depending much on a catalyst poison to be used, and is preferably from 0.0001 to 20.0 mol, more preferably from 0.001 to 2.0 mol, per mol of the 11-halo-1,1-dialkoxy-7-undecyne compound (17) in view of the reaction rate and geometrical selectivity.

Examples of the solvent used in the catalytic hydrogenation reaction include hydrocarbons such as hexane, heptane, benzene, toluene, xylene, and cumene; nitriles such as acetonitrile and propionitrile; esters such as methyl acetate, ethyl acetate, n-propyl acetate, and n-butyl acetate; and alcohols such as methanol, ethanol, propanol, butanol, pentanol, hexanol, 2-propanol, 2-butanol, and cyclohexanol.

The solvent may be used either alone or in combination thereof, if necessary. The solvent may be commercially available one.

When the Lindlar catalyst is used, the solvent is preferably a hydrocarbon such as hexane, heptane, toluene, or xylene in view of the reactivity. When a nickel catalyst is used, the solvent is preferably an alcohol such as methanol, ethanol, propanol, butanol, or 2-propanol in view of the reactivity. When a palladium catalyst such as palladium on carbon is used, the solvent is preferably an ester such as methyl acetate or ethyl acetate in view of the reactivity.

An amount of the solvent used varies, depending on a catalyst and/or solvent to be used, and is preferably from 0 to 1000 g, per mol of the 11-halo-1,1-dialkoxy-7-undecyne compound (17) in view of the reactivity.

A reaction temperature in the catalytic hydrogenation reaction varies, depending on a catalyst and/or solvent to be used, and is preferably from 0 to 160° C., more preferably from 20 to 100° C., in view of the geometrical selectivity.

A reaction time of the catalytic hydrogenation reaction is preferably from 0.5 to 100 hours in view of the yield.

(ii) Reduction Reaction with Zinc in an Alcohol Solvent

The reduction reaction may be carried out using zinc in an alcohol solvent.

The alcohol to be used as a solvent has preferably 1 to 10 carbon atoms, more preferably 1 to 5 carbon atoms. Examples of the alcohol to be used as a solvent include linear alcohol compounds such as methanol, ethanol, propanol, butanol, pentanol, hexanol, heptanol, octanol, nonanol, and decanol; branched alcohol compounds such as 2-propanol and 2-butanol; and cyclic alcohol compounds such as cyclohexanol. Alcohol compounds having 1 to 5 carbon atoms such as methanol, ethanol, propanol, butanol, pentanol, and 2-propanol are preferred in view of the reactivity.

An amount of the alcohol used is preferably from 46 to 1000 g, per mol of the 11-halo-1,1-dialkoxy-7-undecyne compound (17) in view of the reactivity.

An amount of zinc used is preferably from 1.0 to 1000 mol, more preferably from 1.0 to 200 mol, per mol of the 11-halo-1,1-dialkoxy-7-undecyne compound (17) in view of the reactivity.

The reduction reaction may require a long reaction time due to low reactivity of zinc and, therefore, an activator for zinc or an activated zinc that has been previously prepared may be used, if necessary.

Examples of the activator include 1,2-dibromoethane, cuprous chloride, cuprous bromide, cuprous iodide, lithium bromide, iodine, and chlorotrimethylsilane.

The activator may be used either alone or in combination thereof, if necessary.

An amount of the activator used is preferably from 0.01 to 10.0 mol, per mol of the 11-halo-1,1-dialkoxy-7-undecyne compound (17) in view of the reactivity.

Activated zinc may be prepared, for example, by treating metallic zinc with an acid such as hydrochloric acid, reducing zinc chloride with metallic lithium in tetrahydrofuran or 2-methyltetrahydrofuran, or reacting metallic zinc with 1,2-dibromoethane and lithium dibromocuprate in tetrahydrofuran or 2-methyltetrahydrofuran.

A reaction temperature in the reduction reaction varies, depending on a solvent to be used, and is preferably from 20 to 180° C. in view of the reactivity.

A reaction time of the reduction reaction is preferably from 0.5 to 150 hours in view of the completion of the reaction.

(iii) Reduction by Hydroboration with a Dialkylborane, Followed by Protonation

In this reduction, hydroboration is first carried out using a dialkylborane in a solvent.

The dialkylborane to be used in the hydroboration has preferably 4 to 18 carbon atoms, more preferably 6 to 12 carbon atoms.

Examples of the dialkylborane include dicyclohexylborane, diisoamylborane, disiamylborane, 9-borabicyclo[3.3.1]nonane (9-BBN), diisopinocampheylborane, catecholborane, and pinacolborane. Dicyclohexylborane and diisoamylborane are preferred in view of the reactivity.

An amount of the dialkylborane used is preferably from 1.0 to 4.0 mol, per mol of the 11-halo-1,1-dialkoxy-7-undecyne compound (17) in view of the reactivity.

Examples of the solvent used in the hydroboration include ethers such as tetrahydrofuran, 2-methyltetrahydrofuran, diethyl ether, dibutyl ether, 4-methyltetrahydropyran, cyclopentylmethylether, 1,4-dioxane, and diethyleneglycol dimethyl ether; and hydrocarbons such as hexane, heptane, benzene, toluene, xylene, and cumene. Ethers such as tetrahydrofuran, 2-methyltetrahydrofuran, 4-methyltetrahydropyran, and diethyleneglycol dimethyl ether are more preferred in view of the reactivity.

The solvent may be used either alone or in combination thereof, if necessary. The solvent may be commercially available one.

An amount of the solvent used is preferably from 100 to 3000 g, per mol of the 11-halo-1,1-dialkoxy-7-undecyne compound (17) in view of the reactivity.

A reaction temperature in the hydroboration is preferably from −20° C. to 50° C. in view of the geometrical selectivity.

A reaction time of the hydroboration varies, depending on a reaction temperature and/or a production scale, and is preferably from 0.5 to 100 hours in view of the reactivity.

For the reduction, the protonation is carried out with an acid in a solvent after the hydroboration.

Examples of the acid used in the protonation after the hydroboration include carboxylic acids such as acetic acid, propionic acid, butyric acid, pentanoic acid, pivalic acid, heptanoic acid, trifluoroacetic acid, chloroacetic acid, formic acid, and oxalic acid; sulfonic acids such as p-toluenesulfonic acid; and mineral acids such as sulfuric acid, hydrochloric acid, nitric acid, and phosphoric acid. Carboxylic acids such as acetic acid and propionic acid are preferred in view of the reactivity.

An amount of the acid used is preferably from 2.0 to 20.0 mol, per mol of the 11-halo-1,1-dialkoxy-7-undecyne compound (17) in view of the reactivity.

A solvent and its amount used in the protonation may be same as in the hydroboration, because the protonation may be carried out in the reaction system after the hydroboration.

A reaction temperature in the protonation varies, depending on a reagent to be used, and is preferably from 0° C. to 150° C. in view of the reaction rate.

A reaction time of the protonation varies, depending on a reaction temperature and/or a production scale, and is preferably from 1 to 70 hours in view of the reactivity.

(iv) Reduction Reaction Using Potassium Hydroxide and N,N-Dimethylformamide (DMF) in the Presence of a Palladium Catalyst Such as Palladium Acetate The reduction reaction is carried out using potassium hydroxide and N,N-dimethylformamide (DMF) in the presence of a palladium catalyst such as palladium acetate, preferably at 100 to 180° C. for 0.5 to 100 hours.

(v) Reduction by Hydrosilylation for Obtaining a Vinylsilane, Followed by Desilylation The hydrosilylation is carried out using trialkylsilane and a metal catalyst such as Wilkinson catalyst or Trost catalyst.

An amount of the metal catalyst used is preferably from 0.0001 to 4.0 mol, more preferably from 0.001 to 1.0 mol, per mol of the 11-halo-1,1-dialkoxy-7-undecyne compound (17), in view of the reactivity.

The hydrosilylation is preferably carried out at 5 to 100° C. for 0.5 to 100 hours.

The desilylation after the hydrosilylation is preferably carried out, for example, using an acid such as sulfuric acid or hydrochloric acid and at least one selected from hydrogen iodide, acetyl chloride, titanium tetrachloride, and iodine at 5° C. to 80° C. for 0.5 to 100 hours.

(vi) Birch Reduction

The Birch reduction is carried out using a metal in ammonia.

An amount of ammonia used is preferably from 1.0 to 10000 mol, more preferably from 10 to 3000 mol, per mol of the 11-halo-1,1-dialkoxy-7-undecyne compound (17) in view of the reactivity.

Examples of the metal include alkaline metals such as potassium, sodium, and lithium; and alkaline earth metals such as calcium and magnesium.

An amount of the metal used is preferably from 1.0 to 1000 mol, more preferably from 1.0 to 100 mol, per mol of the 11-halo-1,1-dialkoxy-7-undecyne compound (17) in view of the reactivity.

In the Birch reduction, a proton source is preferably incorporated in addition to ammonia.

Examples of the proton source include alcohols such as methanol, ethanol, n-propanol, 2-propanol, and 2-methyl-2-propanol; and tetrahydrofuran (THF), and 2-methyltetrahydrofuran.

The proton source may be used either alone or in combination thereof, if necessary. The proton source may be commercially available one.

An amount of the proton source used is preferably from 1.0 to 10000 mol, more preferably from 1.0 to 3000 mol, per mol of the 11-halo-1,1-dialkoxy-7-undecyne compound (17) in view of the reactivity.

A reaction temperature in the Birch reduction is preferably from −78 to 0° C., more preferably from −78 to −33° C. in view of the reactivity.

A reaction time of the Birch reduction varies, depending on a production scale, and is preferably from 0.5 to 100 hours in view of the reactivity.

(vii) Ammonia-Free Birch Reduction

The ammonia-free Birch reduction is carried out using a metal in a crown ether.

Examples of the crown ether include 12-crown-4, 15-crown-5, 18-crown-6, dibenzo-18-crown-6, and diaza-18-crown-6.

The crown ether may be used either alone or in combination thereof, if necessary. The crown ether may be commercially available one.

An amount of the crown ether used is preferably from 1.0 to 100.0 mol, more preferably from 1.0 to 20.0 mol, per mol of the 11-halo-1,1-dialkoxy-7-undecyne compound (17) in view of the reactivity.

Examples of the metal include alkaline metals such as potassium, sodium, and lithium; and alkaline earth metals such as calcium and magnesium.

An amount of the metal used is preferably from 1.0 to 100.0 mol, more preferably from 1.0 to 20.0 mol, per mol of the 11-halo-1,1-dialkoxy-7-undecyne compound (17) in view of the reactivity.

In the ammonia-free Birch reduction, a proton source is preferably incorporated in addition to the crown ether. Examples of the proton source include alcohols such as methanol, ethanol, n-propanol, 2-propanol, and 2-methyl-2-propanol; and tetrahydrofuran (THF), and 2-methyltetrahydrofuran.

The proton source may be used either alone or in combination thereof, if necessary. The proton source may be commercially available one.

An amount of the proton source used is preferably from 1.0 to 100.0 mol, more preferably from 1.0 to 20.0 mol, per mol of the 11-halo-1,1-dialkoxy-7-undecyne compound (17) in view of the reactivity.

A reaction temperature in the ammonia-free Birch reduction varies, depending on a metal and/or a crown ether to be used, and is preferably from −78 to 100° C., more preferably from −40 to 40° C. in view of the reactivity.

A reaction time in the ammonia-free Birch reduction varies, depending on a metal, a crown ether to be used, and/or a production scale, and is preferably from 0.1 to 100 hours, more preferably from 0.1 to 5 hours in view of the reactivity.

(viii) Benkeser Reduction

The Benkeser reduction is carried out using a metal in an alkylamine.

Examples of the alkylamine include lower amines such as methylamine, ethylamine, propylamine, and 1,3-propanediamine.

An amount of the alkylamine used is preferably from 1.0 to 5000 mol, more preferably from 1.0 to 1000 mol, per mol of the 11-halo-1,1-dialkoxy-7-undecyne compound (17) in view of the reactivity.

Examples of the metal include alkaline metals such as potassium, sodium, and lithium; and alkaline earth metals such as calcium and magnesium.

An amount of the metal used is preferably from 1.0 to 1000 mol, more preferably from 1.0 to 100 mol, per mol of the 11-halo-1,1-dialkoxy-7-undecyne compound (17) in view of the reactivity.

A reaction temperature in the Benkeser reduction is preferably from −78 to 100° C., more preferably from −78 to 60° C. in view of the reactivity.

A reaction time of the Benkeser reduction varies, depending on a production scale, and is preferably from 0.5 to 100 hours in view of the reactivity.

The 11-halo-1,1-dialkoxy-7-undecene compound (1) is useful for preparing synthetic intermediates for the preparation of (7E)-7-dodecenal, which is the sex pheromone of *Coniesa ignefusalis*, (7Z)-7-tetradecenal, which is the sex pheromone of *Spaelotis clandestine*, and (7Z)-7-hexadecenal, which is the sex pheromone of *Helicoverpa armigera*.

(A-2). 11,11-Dialkoxy-4-Undecenyltriarylphosphonium Halide Compound (3)

Next, a 11,11-dialkoxy-4-undecenyltriarylphosphonium halide compound (3) will be explained.

$$Y^-Ar_3P^+(CH_2)_3CH{=}CH(CH_2)_5CH(OR^1)(OR^2) \quad (3)$$

Y represents a halogen atom as defined for the general formula (A). Specifically, the halogen atom, Y, may be a chlorine atom, a bromine atom, or an iodine atom. A bromine atom and an iodine atom are preferred in view of the reactivity.

$R^1$ and $R^2$ in the general formula (3) are as defined for the general formula (1).

Ar in the general formula (3) represents, independently of each other, an aryl group. The aryl group has preferably 6 to 24 carbon atoms, more preferably 6 to 12 carbon atoms, even more preferably 6 to 7 carbon atoms. Examples of the aryl group include a phenyl group (Ph group), a tolyl group, a naphthyl group, and an anthracenyl group. The aryl group is preferably a phenyl group in view of the ease of synthesis. More preferably, all of the three aryl groups are a phenyl group.

The 11,11-dialkoxy-4-undecenyltriarylphosphonium halide compound (3) include a (4Z)-11,11-dialkoxy-4-undecenyltriarylphosphonium halide compound of the general formula (3-Z) and a (4E)-11,11-dialkoxy-4-undecenyltriarylphosphonium halide compound of the general formula (3-E).

Specific examples of the (4Z)-11,11-dialkoxy-4-undecenyltriarylphosphonium halide compound (3-Z) include the following compounds:

(4Z)-11,11-dialkoxy-4-undecenyltriphenylphosphonium chloride compounds (3-Z: Y=chlorine atom, Ar=phenyl group) such as (4Z)-11,11-dimethoxy-4-undecenyltriphenylphosphonium chloride, (4Z)-11,11-diethoxy-4-undecenyltriphenylphosphonium chloride, (4Z)-11,11-dipropyloxy-4-undecenyltriphenylphosphonium chloride, (4Z)-11,11-dibutyloxy-4-undecenyltriphenylphosphonium chloride, (4Z)-11,11-dipentyloxy-4-undecenyltriphenylphosphonium chloride, (4Z)-11,11-dihexyloxy-4-undecenyltriphenylphosphonium chloride, (4Z)-11,11-diheptyloxy-4-undecenyltriphenylphosphonium chloride, (4Z)-11,11-dioctyloxy-4-undecenyltriphenylphosphonium chloride, (4Z)-11,11-dinonyloxy-4-undecenyltriphenylphosphonium chloride, and (4Z)-11,11-didecyloxy-4-undecenyltriphenylphosphonium chloride;

(4Z)-11,11-dialkoxy-4-undecenyltritolylphosphonium chloride compounds (3-Z: Y=chlorine atom, Ar=tolyl group) such as (4Z)-11,11-dimethoxy-4-undecenyltritolylphosphonium chloride, (4Z)-11,11-diethoxy-4-undecenyltritolylphosphonium chloride, (4Z)-11,11-dipropyloxy-4-undecenyltritolylphosphonium chloride, (4Z)-11,11-dibutyloxy-4-undecenyltritolylphosphonium chloride, (4Z)-11,11-dipentyloxy-4-undecenyltritolylphosphonium chloride, (4Z)-11,11-dihexyloxy-4-undecenyltritolylphosphonium chloride, (4Z)-11,11-diheptyloxy-4-undecenyltritolylphosphonium chloride, (4Z)-11,11-dioctyloxy-4-undecenyltritolylphosphonium chloride, (4Z)-11,11-dinonyloxy-4-undecenyltritolylphosphonium chloride, and (4Z)-11,11-didecyloxy-4-undecenyltritolylphosphonium chloride;

(4Z)-11,11-dialkoxy-4-undecenyltriphenylphosphonium bromide compounds (3-Z: Y=bromine atom, Ar=phenyl group) such as (4Z)-11,11-dimethoxy-4-undecenyltriphenylphosphonium bromide, (4Z)-11,11-diethoxy-4-undecenyltriphenylphosphonium bromide, (4Z)-11,11-dipropyloxy-4-undecenyltriphenylphosphonium bromide, (4Z)-11,11-dibutyloxy-4-undecenyltriphenylphosphonium bromide, (4Z)-11,11-dipentyloxy-4-undecenyltriphenylphosphonium bromide, (4Z)-11,11-dihexyloxy-4-undecenyltriphenylphosphonium bromide, (4Z)-11,11-diheptyloxy-4-undecenyltriphenylphosphonium bromide, (4Z)-11,11-dioctyloxy-4-undecenyltriphenylphosphonium bromide, (4Z)-11,11-dinonyloxy-4-undecenyltriphenylphosphonium bromide, and (4Z)-11,11-didecyloxy-4-undecenyltriphenylphosphonium bromide;

(4Z)-11,11-dialkoxy-4-undecenyltritolylphosphonium bromide compounds (3-Z: Y=bromine atom, Ar=tolyl group) such as (4Z)-11,11-dimethoxy-4-undecenyltritolylphosphonium bromide, (4Z)-11,11-diethoxy-4-undecenyltritolylphosphonium bromide, (4Z)-11,11-dipropyloxy-4-undecenyltritolylphosphonium bromide, (4Z)-11,11-dibutyloxy-4-undecenyltritolylphosphonium bromide, (4Z)-11,11-dipentyloxy-4-undecenyltritolylphosphonium bromide, (4Z)-11,11-dihexyloxy-4-undecenyltritolylphosphonium bromide, (4Z)-11,11-diheptyloxy-4-undecenyltritolylphosphonium bromide, (4Z)-11,11-dioctyloxy-4-undecenyltritolylphosphonium bromide, (4Z)-11,11-dinonyloxy-4-undecenyltritolylphosphonium bromide, and (4Z)-11,11-didecyloxy-4-undecenyltritolylphosphonium bromide;

(4Z)-11,11-dialkoxy-4-undecenyltriphenylphosphonium iodide compounds (3-Z: Y=iodine atom, Ar=phenyl group) such as (4Z)-11,11-dimethoxy-4-undecenyltriphenylphosphonium iodide, (4Z)-11,11-diethoxy-4-undecenyltriphenylphosphonium iodide, (4Z)-11,11-dipropyloxy-4-undecenyltriphenylphosphonium iodide, (4Z)-11,11-dibutyloxy-4-undecenyltriphenylphosphonium iodide, (4Z)-11,11-dipentyloxy-4-undecenyltriphenylphosphonium iodide, (4Z)-11,11-dihexyloxy-4-undecenyltriphenylphosphonium iodide, (4Z)-11,11-diheptyloxy-4-undecenyltriphenylphosphonium iodide, (4Z)-11,11-dioctyloxy-4-undecenyltriphenylphosphonium iodide, (4Z)-11,11-dinonyloxy-4-undecenyltriphenylphosphonium iodide, and (4Z)-11,11-didecyloxy-4-undecenyltriphenylphosphonium iodide; and (4Z)-11,11-dialkoxy-4-undecenyltritolylphosphonium iodide compounds (3-Z: Y=iodine atom, Ar=tolyl group) such as (4Z)-11,11-dimethoxy-4-undecenyltritolylphosphonium iodide, (4Z)-11,11-diethoxy-4-undecenyltritolylphosphonium iodide, (4Z)-11,11-dipropyloxy-4-undecenyltritolylphosphonium iodide, (4Z)-11,11-dibutyloxy-4-undecenyltritolylphosphonium iodide, (4Z)-11,11-dipentyloxy-4-undecenyltritolylphosphonium iodide, (4Z)-11,11-dihexyloxy-4-undecenyltritolylphosphonium iodide, (4Z)-11,11-diheptyloxy-4-undecenyltritolylphosphonium iodide, (4Z)-11,11-dioctyloxy-4-undecenyltritolylphosphonium iodide, (4Z)-11,11-dinonyloxy-4-undecenyltritolylphosphonium iodide, and (4Z)-11,11-didecyloxy-4-undecenyltritolylphosphonium iodide.

The (4Z)-11,11-dialkoxy-4-undecenyltriarylphosphonium halide compound (3-Z) is preferably a (4Z)-11,11-dialkoxy-4-undecenyltriphenylphosphonium chloride compound (3-Z: Y=chlorine atom, Ar=phenyl group), a (4Z)-11,11-dialkoxy-4-undecenyltriphenylphosphonium bromide compound (3-Z: Y=bromine atom, Ar=phenyl group), or a (4Z)-11,11-dialkoxy-4-undecenyltriphenylphosphonium iodide compound (3-Z: Y=iodine atom, Ar=phenyl group) in view of easy preparation.

Specific examples of the (4E)-11,11-dialkoxy-4-undecenyltriarylphosphonium halide compound (3-E) include the following compounds:

(4E)-11,11-dialkoxy-4-undecenyltriphenylphosphonium chloride compounds (3-E: Y=chlorine atom, Ar=phenyl group) such as (4E)-11,11-dimethoxy-4-undecenyltriphenylphosphonium chloride, (4E)-11,11-diethoxy-4-undecenyltriphenylphosphonium chloride, (4E)-11,11-dipropyloxy-4-undecenyltriphenylphosphonium chloride, (4E)-11,11-dibutyloxy-4-undecenyltriphenylphosphonium chloride, (4E)-11,11-dipentyloxy-4-undecenyltriphenylphosphonium chloride, (4E)-11,11-dihexyloxy-4-undecenyltriphenylphosphonium chloride, (4E)-11,11-diheptyloxy-4-undecenyltriphenylphosphonium chloride, (4E)-11,11-dioctyloxy-4-undecenyltriphenylphosphonium chloride, (4E)-11,11-dinonyloxy-4-undecenyltriphenylphosphonium chloride, and (4E)-11,11-didecyloxy-4-undecenyltriphenylphosphonium chloride;

(4E)-11,11-dialkoxy-4-undecenyltritolylphosphonium chloride compounds (3-E: Y=chlorine atom, Ar=tolyl group) such as (4E)-11,11-dimethoxy-4-undecenyltritolylphosphonium chloride, (4E)-11,11-diethoxy-4-undecenyltritolylphosphonium chloride, (4E)-11,11-dipropyloxy-4-undecenyltritolylphosphonium chloride, (4E)-11,11-dibutyloxy-4-undecenyltritolylphosphonium chloride, (4E)-11,11-dipentyloxy-4-undecenyltritolylphosphonium chloride, (4E)-11,11-dihexyloxy-4-undecenyltritolylphosphonium chloride, (4E)-11,11-diheptyloxy-4-undecenyltritolylphosphonium chloride, (4E)-11,11-dioctyloxy-4-undecenyltritolylphosphonium chloride, (4E)-11,11-dinonyloxy-4-undecenyltritolylphosphonium chloride, and (4E)-11,11-didecyloxy-4-undecenyltritolylphosphonium chloride;

(4E)-11,11-dialkoxy-4-undecenyltriphenylphosphonium bromide compounds (3-E: Y=bromine atom, Ar=phenyl group) such as (4E)-11,11-dimethoxy-4-undecenyltriphenylphosphonium bromide, (4E)-11,11-diethoxy-4-undecenyltriphenylphosphonium bromide, (4E)-11,11-dipropyloxy-4-undecenyltriphenylphosphonium bromide, (4E)-11,11-dibutyloxy-4-undecenyltriphenylphosphonium bromide, (4E)-11,11-dipentyloxy-4-undecenyltriphenylphosphonium bromide, (4E)-11,11-dihexyloxy-4-undecenyltriphenylphosphonium bromide, (4E)-11,11-diheptyloxy-4-undecenyltriphenylphosphonium bromide, (4E)-11,11-dioctyloxy-4-undecenyltriphenylphosphonium bromide, (4E)-11,11-dinonyloxy-4-undecenyltriphenylphosphonium bromide, and (4E)-11,11-didecyloxy-4-undecenyltriphenylphosphonium bromide;

(4E)-11,11-dialkoxy-4-undecenyltritolylphosphonium bromide compounds (3-E: Y=bromine atom, Ar=tolyl group) such as (4E)-11,11-dimethoxy-4-undecenyltritolylphosphonium bromide, (4E)-11,11-diethoxy-4-undecenyltritolylphosphonium bromide, (4E)-11,11-dipropyloxy-4-undecenyltritolylphosphonium bromide, (4E)-11,11-dibutyloxy-4-undecenyltritolylphosphonium bromide, (4E)-11,11-dipentyloxy-4-undecenyltritolylphosphonium bromide, (4E)-11,11-dihexyloxy-4-undecenyltritolylphosphonium bromide, (4E)-11,11-diheptyloxy-4-undecenyltritolylphosphonium bromide, (4E)-11,11-dioctyloxy-4-undecenyltritolylphosphonium bromide, (4E)-11,11-dinonyloxy-4-undecenyltritolylphosphonium bromide, and (4E)-11,11-didecyloxy-4-undecenyltritolylphosphonium bromide;

(4E)-11,11-dialkoxy-4-undecenyltriphenylphosphonium iodide compounds (3-E: Y=iodine atom, Ar=phenyl group) such as (4E)-11,11-dimethoxy-4-undecenyltriphenylphosphonium iodide, (4E)-11,11-diethoxy-4-undecenyltriphenylphosphonium iodide, (4E)-11,11-dipropyloxy-4-undecenyltriphenylphosphonium iodide, (4E)-11,11-dibutyloxy-4-undecenyltriphenylphosphonium iodide, (4E)-11,11-dipentyloxy-4-undecenyltriphenylphosphonium iodide, (4E)-11,11-dihexyloxy-4-undecenyltriphenylphosphonium iodide, (4E)-11,11-diheptyloxy-4-undecenyltriphenylphosphonium iodide, (4E)-11,11-dioctyloxy-4-undecenyltriphenylphosphonium iodide, (4E)-11,11-dinonyloxy-4-undecenyltriphenylphosphonium iodide, and (4E)-11,11-didecyloxy-4-undecenyltriphenylphosphonium iodide; and (4E)-11,11-dialkoxy-4-undecenyltritolylphosphonium iodide compounds (3-E: Y=iodine atom, Ar=tolyl group) such as (4E)-11,11-dimethoxy-4-undecenyltritolylphosphonium iodide, (4E)-11,11-diethoxy-4-undecenyltritolylphosphonium iodide, (4E)-11,11-dipropyloxy-4-undecenyltritolylphosphonium iodide, (4E)-11,11-dibutyloxy-4-undecenyltritolylphosphonium iodide, (4E)-11,11-dipentyloxy-4-undecenyltritolylphosphonium iodide, (4E)-11,11-dihexyloxy-4-undecenyltritolylphosphonium iodide, (4E)-11,11-diheptyloxy-4-undecenyltritolylphosphonium iodide, (4E)-11,11-dioctyloxy-4-undecenyltritolylphosphonium iodide, (4E)-11,11-dinonyloxy-4-undecenyltritolylphosphonium iodide, and (4E)-11,11-didecyloxy-4-undecenyltritolylphosphonium iodide.

The (4E)-11,11-dialkoxy-4-undecenyltriarylphosphonium halide compound (3-E) is preferably a (4E)-11,11-dialkoxy-4-undecenyltriphenylphosphonium chloride compound (3-E: Y=chlorine atom, Ar=phenyl group), a (4E)-11,11-dialkoxy-4-undecenyltriphenylphosphonium bromide compound (3-E: Y=bromine atom, Ar=phenyl group), or a (4E)-11,11-dialkoxy-4-undecenyltriphenylphosphonium iodide compound (3-E: Y=iodine atom, Ar=phenyl group) in view of easy preparation.

The (4Z)-11,11-dialkoxy-4-undecenyltriarylphosphonium halide compound (3-Z) may be used as a common synthetic intermediate in the preparation of (7Z,11Z,13E)-7,11,13-hexadecatrienal (7) and the preparation of (7Z,11Z)-7,11-hexadecadienal (10), as will be mentioned below.

The processes for preparing the (4Z)-11,11-dialkoxy-4-undecenyltriarylphosphonium halide compound (3-Z) and the (4E)-11,11-dialkoxy-4-undecenyltriarylphosphonium halide compound (3-E) will be described in the following section B.

B. Process for Preparing the 11,11-Dialkoxy-4-Undecenyltriarylphosphonium Halide Compound (3)

Hereinafter, the (4Z)-11,11-dialkoxy-4-undecenyltriarylphosphonium halide compound (3-Z) is taken up to describe a process for preparing the 11,11-dialkoxy-4-undecenyltriarylphosphonium halide compound (3). When the (4E)-11,11-dialkoxy-4-undecenyltriarylphosphonium halide compound (3-E) is used instead of the (4Z)-11,11-dialkoxy-4-undecenyltriarylphosphonium halide compound (3-Z), the corresponding reactions proceed in a similar manner to form the corresponding compound.

The (4Z)-11,11-dialkoxy-4-undecenyltriarylphosphonium halide compound (3-Z) may be prepared, for example, by subjecting the (7Z)-11-halo-1,1-dialkoxy-7-undecene compound (1-Z) to a phosphonium salt formation reaction with a phosphine compound of the following general formula (2), as shown in the following chemical reaction formula:

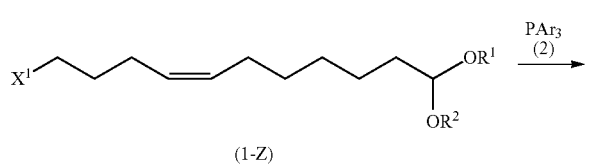

(1-Z)

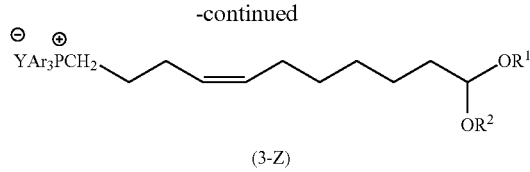

(3-Z)

Examples of the phosphine compound (2) include triarylphosphine compounds such as triphenylphosphine, tritolylphosphine, trinaphthylphosphine, and trianthracenylphosphine. Triphenylphosphine is preferred in view of the reactivity.

An amount of the phosphine compound (2) used is preferably from 0.8 to 5.0 mol, per mol of the (7Z)-11-halo-1,1-dialkoxy-7-undecene compound (1-Z) in view of the reactivity.

Phosphonium Salt Formation Reaction

A halide may be incorporated in the preparation of the (4Z)-11,11-dialkoxy-4-undecenyltriarylphosphonium halide compound (3-Z), if necessary.

Examples of the halide include iodides such as sodium iodide and potassium iodide; and bromides such as sodium bromide and potassium bromide. Iodides such as sodium iodide and potassium iodide are preferred in view of the reactivity.

When any halide is not incorporated in the preparation of the (4Z)-11,11-dialkoxy-4-undecenyltriarylphosphonium halide compound (3-Z), Y in the general formula (3-Z) is the same halogen atom as $X^1$ in the general formula (1-Z). When an iodide is incorporated as the halide in the preparation, Y in the general formula (3-Z) is an iodine atom or the same halogen atom as $X^1$ in the general formula (1-Z) of the (7Z)-11-halo-1,1-dialkoxy-7-undecene compound (1-Z).

The halide may be used either alone or in combination thereof, if necessary. The halide may be commercially available one.

An amount of the halide used is preferably from 0.1 to 10.0 mol, more preferably from 0.8 to 4.0 mol, per mol of the (7Z)-11-halo-1,1-dialkoxy-7-undecene compound (1-Z) in view of the reactivity.

A base may be incorporated in the preparation of the (4Z)-11,11-dialkoxy-4-undecenyltriarylphosphonium halide compound (3-Z), if necessary.

Examples of the base include alkaline metal carbonates such as potassium carbonate and sodium carbonate; alkaline earth metal carbonates such as calcium carbonate and magnesium carbonate; and amines such as triethylamine, tripropylamine, triisopropylamine, tributylamine, N,N-diethylaniline, and pyridine. Alkaline metal carbonates are preferred in view of the handling.

The base may be used either alone or in combination thereof, if necessary. The base may be commercially available one.

An amount of the base used is preferably from preferably from 0.001 to 1.0 mol, per mol of the (7Z)-11-halo-1,1-dialkoxy-7-undecene compound (1-Z) in view of the reactivity.

A solvent may be incorporated in the preparation of the (4Z)-11,11-dialkoxy-4-undecenyltriarylphosphonium halide compound (3-Z), if necessary.

Examples of the solvent include ether solvents such as tetrahydrofuran, 2-methyltetrahydrofuran, diethyl ether, dibutyl ether, 4-methyltetrahydropyran, cyclopentylmethylether, and 1,4-dioxane; hydrocarbon solvents such as hexane, heptane, benzene, toluene, xylene, and cumene; and polar solvents such as N,N-dimethylformamide, N,N-dimethylacetamide, N-methylpyrrolidone, dimethyl sulfoxide, γ-butyrolactone, acetonitrile, dichloromethane, and chloroform. Ether solvents such as tetrahydrofuran, 2-methyltetrahydrofuran, and 4-methyltetrahydropyran; and polar solvents such as acetonitrile, N,N-dimethylformamide, and N,N-dimethylacetamide are preferred in view of the reactivity.

The solvent may be used either alone or in combination thereof, if necessary. The solvent may be commercially available one.

An amount of the solvent used is preferably from 50 to 7000 g, per mol of the (7Z)-11-halo-1,1-dialkoxy-7-undecene compound (1-Z) in view of the reactivity.

A reaction temperature in the preparation of the (4Z)-11,11-dialkoxy-4-undecenyltriarylphosphonium halide compound (3-Z) varies, depending on a solvent to be used, and is preferably from 30 to 180° C., more preferably from 50 to 150° C.

A reaction time in the preparation of the (4Z)-11,11-dialkoxy-4-undecenyltriarylphosphonium halide compound (3-Z) varies, depending on a solvent to be used and/or a production scale, and is preferably from 0.5 to 100 hours.

C. (3E,5Z,9Z)-16,16-dialkoxy-3,5,9-hexadecatriene Compound (6) and (5Z,9Z)-16,16-dialkoxy-5,9-hexadecadiene Compound (9) and Processes for Preparing the Same (C-1). A (3E,5Z,9Z)-16,16-dialkoxy-3,5,9-hexadecatriene compound (6) and a process for preparing the same will be described below.

The (3E,5Z,9Z)-16,16-dialkoxy-3,5,9-hexadecatriene compound (6) may be prepared according to the following chemical reaction formulae. First, a (4Z)-11,11-dialkoxy-4-undecenyltriarylphosphonium halide compound (3-Z) is subjected to a deprotonation reaction in the presence of a base to obtain a reaction product mixture. The reaction product mixture obtained from the deprotonation reaction is estimated to contain a triarylphosphonium (4Z)-11,11-dialkoxy-4-undecenylide compound (4) as a reaction product (hereinafter, the reaction product is considered a triarylphosphonium (4Z)-11,11-dialkoxy-4-undecenylide compound (4) in the following description). Next, the reaction product mixture is subjected to a Wittig reaction with (2E)-2-pentenal of the following formula (5), for example in situ, to form a (3E,5Z,9Z)-16,16-dialkoxy-3,5,9-hexadecatriene compound (6).

First, the triarylphosphonium (4Z)-11,11-dialkoxy-4-undecenylide compound (4), which is contained in a reaction product mixture, will be described.

$R^1$ and $R^2$ in the general formula (4) are as defined for the general formula (1), and Ar is as defined for the general formula (3).

Specific examples of the triarylphosphonium (4Z)-11,11-dialkoxy-4-undecenylide compound (4) include the following compounds:

triphenylphosphonium (4Z)-11,11-dialkoxy-4-undecenylide compounds (4: Ar=phenyl group) such as triphenylphosphonium (4Z)-11,11-dimethoxy-4-undecenylide, triphenylphosphonium (4Z)-11,11-diethoxy-4-undecenylide, triphenylphosphonium (4Z)-11,11-dipropyloxy-4-undecenylide, triphenylphosphonium (4Z)-11,11-dibutyloxy-4-undecenylide, triphenylphosphonium (4Z)-11,11-dipentyloxy-4-undecenylide, triphenylphosphonium (4Z)-11,11-dihexyloxy-4-undecenylide, triphenylphosphonium (4Z)-11,11-diheptyloxy-4-undecenylide, triphenylphosphonium (4Z)-11,11-dioctyloxy-4-undecenylide, triphenylphosphonium (4Z)-11,11-dinonyloxy-4-undecenylide, and triphenylphosphonium (4Z)-11,11-didecyloxy-4-undecenylide; and tritolylphosphonium (4Z)-11,11-dialkoxy-4-undecenylide compounds (4: Ar=tolyl group) such as tritolylphosphonium (4Z)-11,11-dimethoxy-4-undecenylide, tritolylphosphonium (4Z)-11,11-diethoxy-4-undecenylide, tritolylphosphonium (4Z)-11,11-dipropyloxy-4-undecenylide, tritolylphosphonium (4Z)-11,11-dibutyloxy-4-undecenylide, tritolylphosphonium (4Z)-11,11-dipentyloxy-4-undecenylide, tritolylphosphonium (4Z)-11,11-dihexyloxy-4-undecenylide, tritolylphosphonium (4Z)-11,11-diheptyloxy-4-undecenylide, tritolylphosphonium (4Z)-11,11-dioctyloxy-4-undecenylide, tritolylphosphonium (4Z)-11,11-dinonyloxy-4-undecenylide, and tritolylphosphonium (4Z)-11,11-didecyloxy-4-undecenylide.

The triarylphosphonium (4Z)-11,11-dialkoxy-4-undecenylide compound (4) is preferably a triphenylphosphonium (4Z)-11,11-dialkoxy-4-undecenylide compound (4: Ar=phenyl group) in view of easy preparation.

Deprotonation Reaction

The reaction product mixture may be prepared by adding a base in a reaction system after preparing a (4Z)-11,11-dialkoxy-4-undecenyltriarylphosphonium halide compound (3-Z) to directly form a triarylphosphonium (4Z)-11,11-

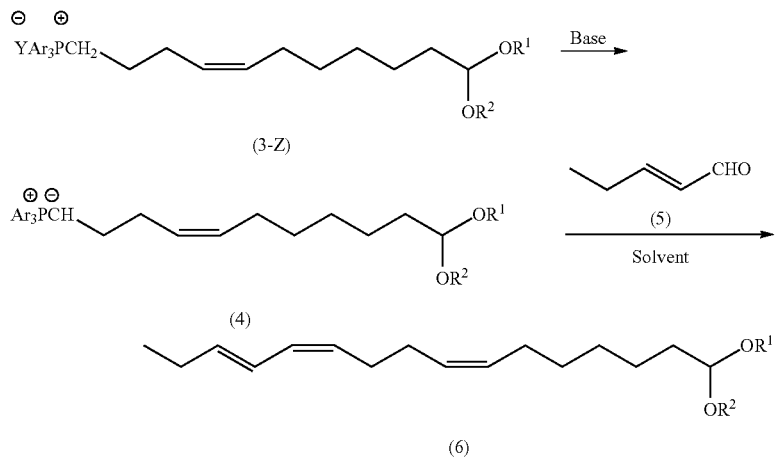

dialkoxy-4-undecenylide compound (4) or by purifying a (4Z)-11,11-dialkoxy-4-undecenyltriarylphosphonium halide compound (3-Z) and then reacting the purified product with a base to form a triarylphosphonium (4Z)-11,11-dialkoxy-4-undecenylide compound (4).

Examples of the base used in the preparation of the reaction product mixture include alkyllithiums such as n-butyllithium and tert-butyllithium; organometallic reagents such as methylmagnesium chloride, methylmagnesium bromide, sodium acetylide, and potassium acetylide; metal alkoxides such as potassium tert-butoxide, sodium tert-butoxide, potassium methoxide, sodium methoxide, potassium ethoxide, and sodium ethoxide; and metal amides such as lithium diisopropylamide and sodium bis(trimethylsilyl)amide. The base is preferably a metal alkoxide, more preferably potassium tert-butoxide, sodium methoxide, or sodium ethoxide in view of the reactivity.

An amount of the base used is preferably from 0.7 to 5.0 mol, per mol of the (7Z)-11-halo-1,1-dialkoxy-7-undecene compound (1-Z) or the (4Z)-11,11-dialkoxy-4-undecenyltriarylphosphonium halide compound (3-Z) in view of the reactivity.

A solvent may be incorporated in the preparation of the (4Z)-11,11-dialkoxy-4-undecenyltriarylphosphonium halide compound (3-Z) and the triarylphosphonium (4Z)-11,11-dialkoxy-4-undecenylide compound (4), if necessary.

Examples of the solvent include ether solvents such as tetrahydrofuran, 2-methyltetrahydrofuran, diethyl ether, dibutyl ether, 4-methyltetrahydropyran, cyclopentylmethylether, and 1,4-dioxane; hydrocarbon solvents such as hexane, heptane, benzene, toluene, xylene, and cumene; and polar solvents such as N,N-dimethylformamide, N,N-dimethylacetamide, N-methylpyrrolidone, dimethyl sulfoxide, γ-butyrolactone, acetonitrile, dichloromethane, and chloroform. Ether solvents such as tetrahydrofuran, 2-methyltetrahydrofuran, and 4-methyltetrahydropyran; and polar solvents such as acetonitrile, N,N-dimethylformamide, and N,N-dimethylacetamide are preferred in view of the reactivity.

The solvent may be used either alone or in combination thereof, if necessary. The solvent may be commercially available one.

An amount of the solvent used is preferably from 50 to 7000 g, per mol of the (7Z)-11-halo-1,1-dialkoxy-7-undecene compound (1-Z) or the (4Z)-11,11-dialkoxy-4-undecenyltriarylphosphonium halide compound (3-Z) in view of the reactivity.

A reaction temperature in the preparation of the reaction product mixture varies, depending on a solvent and/or a base to be used, and is preferably from −78 to 70° C. For example, when a metal alkoxide is used as the base, an optimal temperature from −78 to 25° C.

A reaction time in the preparation of the reaction product mixture varies, depending on a solvent to be used and/or a production scale, and is preferably from 0.5 to 100 hours.

Next, the (3E,5Z,9Z)-16,16-dialkoxy-3,5,9-hexadecatriene compound (6) will be described below.

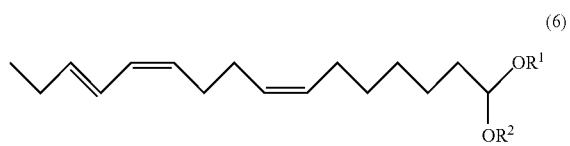

(6)

$R^1$ and $R^2$ in the general formula (6) are as defined for the general formula (1).

Specific examples of the (3E,5Z,9Z)-16,16-dialkoxy-3,5,9-hexadecatriene compound (6) include the following compounds:

(3E,5Z,9Z)-16,16-dimethoxy-3,5,9-hexadecatriene, (3E,5Z,9Z)-16,16-diethoxy-3,5,9-hexadecatriene, (3E,5Z,9Z)-16,16-dipropyloxy-3,5,9-hexadecatriene, (3E,5Z,9Z)-16,16-dibutyloxy-3,5,9-hexadecatriene, (3E,5Z,9Z)-16,16-dipentyloxy-3,5,9-hexadecatriene, (3E,5Z,9Z)-16,16-dihexyloxy-3,5,9-hexadecatriene, (3E,5Z,9Z)-16,16-diheptyloxy-3,5,9-hexadecatriene, (3E,5Z,9Z)-16,16-dioctyloxy-3,5,9-hexadecatriene, (3E,5Z,9Z)-16,16-dinonyloxy-3,5,9-hexadecatriene, and (3E,5Z,9Z)-16,16-didecyloxy-3,5,9-hexadecatriene.

The (3E,5Z,9Z)-16,16-dialkoxy-3,5,9-hexadecatriene compound (6) is preferably (3E,5Z,9Z)-16,16-dimethoxy-3,5,9-hexadecatriene or (3E,5Z,9Z)-16,16-diethoxy-3,5,9-hexadecatriene in view of the economy.

Wittig Reaction

An amount of the triarylphosphonium (4Z)-11,11-dialkoxy-4-undecenylide compound (4) used is preferably from 1.0 to 4.0 mol, more preferably from 1.0 to 2.0 mol, per mol of (2E)-2-pentenal (5) in view of the reactivity.

The triarylphosphonium (4Z)-11,11-dialkoxy-4-undecenylide compound (4) may be used either alone or in combination thereof, if necessary.

(2E)-2-pentenal (5) may be commercially available one or may be prepared in house, for example, by oxidizing (2E)-2-penten-1-ol or hydrolyzing (2E)-1,1-dialkoxy-2-pentene.

A solvent may be used in the Wittig reaction, if necessary.

Examples of the solvent include ether solvents such as tetrahydrofuran, 2-methyltetrahydrofuran, diethyl ether, dibutyl ether, 4-methyltetrahydropyran, cyclopentylmethylether, and 1,4-dioxane; hydrocarbon solvents such as hexane, heptane, benzene, toluene, xylene, and cumene; and polar solvents such as N,N-dimethylformamide, N,N-dimethylacetamide, N-methylpyrrolidone, dimethyl sulfoxide, γ-butyrolactone, acetonitrile, dichloromethane, and chloroform. Ether solvents such as tetrahydrofuran, 2-methyltetrahydrofuran, and 4-methyltetrahydropyran; and polar solvents such as acetonitrile, N,N-dimethylformamide, and N,N-dimethylacetamide are preferred in view of the reactivity.

The solvent may be used either alone or in combination thereof, if necessary. The solvent may be commercially available one.

An amount of the solvent used is preferably from 50 to 7000 g, per mol of (2E)-2-pentenal (5) in view of the reactivity.

A reaction temperature in the Wittig reaction varies, depending on a solvent to be used, and is preferably from −78 to 80° C. The Wittig reaction is more preferably carried out at −78 to 30° C. to be Z-selective. The Wittig reaction may be carried out at −78 to −40° C. and then the resulting synthetic intermediate is subjected to a modified Schlosser procedure by treatment with a strong base such as phenyl lithium, so that E-selectivity is realized. The Wittig reaction may be made E-selective by adding a lithium halide in typical Wittig reaction conditions.

A reaction time of the Wittig reaction varies, depending on a production scale, and is preferably from 0.5 to 100 hours.

(C-2). A (5Z,9Z)-16,16-dialkoxy-5,9-hexadecadiene compound (9) and a process for preparing the same will be described below.

The (5Z,9Z)-16,16-dialkoxy-5,9-hexadecadiene compound (9) may be prepared according to the following chemical reaction formulae. First, a (4Z)-11,11-dialkoxy-4-undecenyltriarylphosphonium halide compound (3-Z) is subjected to a deprotonation reaction in the presence of a base to obtain a reaction product mixture. The reaction product mixture obtained from the deprotonation reaction is estimated to contain a triarylphosphonium (4Z)-11,11-dialkoxy-4-undecenylide compound (4) as a reaction product (hereinafter, the reaction product is considered a triarylphosphonium (4Z)-11,11-dialkoxy-4-undecenylide compound (4) in the following description). Next, the reaction product mixture is subjected to a Wittig reaction, for example in situ, with pentanal of the following formula (8) to form a (5Z,9Z)-16,16-dialkoxy-5,9-hexadecadiene compound (9).

hexadecadiene, (5Z,9Z)-16,16-dinonyloxy-5,9-hexadecadiene, and (5Z,9Z)-16,16-didecyloxy-5,9-hexadecadiene.

The (5Z,9Z)-16,16-dialkoxy-5,9-hexadecadiene compound (9) is preferably (5Z,9Z)-16,16-dimethoxy-5,9-hexadecadiene or (5Z,9Z)-16,16-diethoxy-5,9-hexadecadiene in view of the economy.

Wittig Reaction

An amount of the triarylphosphonium (4Z)-11,11-dialkoxy-4-undecenylide compound (4) used is preferably from 1.0 to 4.0 mol, more preferably from 1.0 to 2.0 mol, per mol of pentanal (8) in view of the reactivity.

The triarylphosphonium (4Z)-11,11-dialkoxy-4-undecenylide compound (4) may be used either alone or in combination thereof, if necessary.

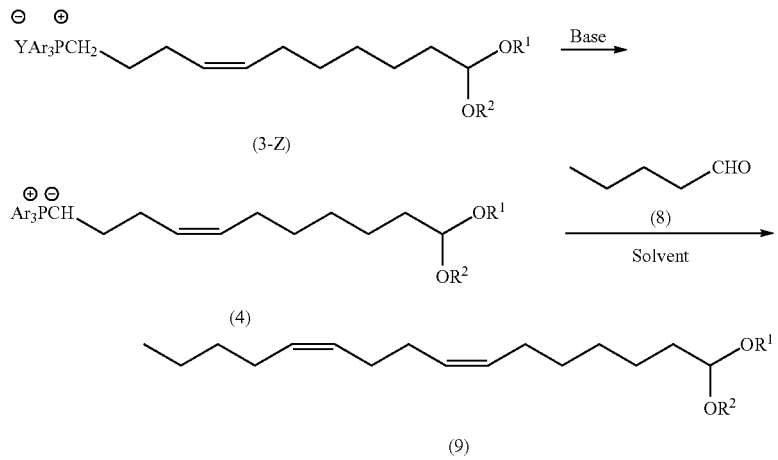

An example of the (4Z)-11,11-dialkoxy-4-undecenyltriarylphosphonium halide compound (3-Z) and a process for preparing the same are as mentioned in section (A-2) and section (B).

The triarylphosphonium (4Z)-11,11-dialkoxy-4-undecenylide compound (4) contained in the reaction product mixture and a process for preparing the same are as mentioned in section (C-1).

Next, the (5Z,9Z)-16,16-dialkoxy-5,9-hexadecadiene compound (9) will be described below.

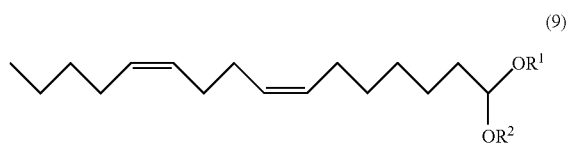

$R^1$ and $R^2$ in the general formula (9) are as defined for the general formula (1).

Specific examples of the (5Z,9Z)-16,16-dialkoxy-5,9-hexadecadiene compound (9) include the following compounds:

(5Z,9Z)-16,16-dimethoxy-5,9-hexadecadiene, (5Z,9Z)-16,16-diethoxy-5,9-hexadecadiene, (5Z,9Z)-16,16-dipropyloxy-5,9-hexadecadiene, (5Z,9Z)-16,16-dibutyloxy-5,9-hexadecadiene, (5Z,9Z)-16,16-dipentyloxy-5,9-hexadecadiene, (5Z,9Z)-16,16-dihexyloxy-5,9-hexadecadiene, (5Z,9Z)-16,16-diheptyloxy-5,9-hexadecadiene, (5Z,9Z)-16,16-dioctyloxy-5,9-

Pentanal (8) may be commercially available one.

When the Wittig reaction is carried out in the presence of a solvent, an amount of the solvent used is preferably from 50 to 7000 g, per mol of pentanal (8) in view of the reactivity.

Other conditions of the Wittig reaction are as mentioned in section (C-1).

(C-3). A process for preparing a mixture containing the (3E,5Z,9Z)-16,16-dialkoxy-3,5,9-hexadecatriene compound (6) and (5Z,9Z)-16,16-dialkoxy-5,9-hexadecadiene compound (9) will be described below.

The (5Z,9Z)-16,16-dialkoxy-5,9-hexadecadiene compound (9) may be prepared according to the following chemical reaction formulae. First, a (4Z)-11,11-dialkoxy-4-undecenyltriarylphosphonium halide compound (3-Z) is subjected to a deprotonation reaction in the presence of a base to obtain a reaction product mixture. The reaction product mixture obtained from the deprotonation reaction is estimated to contain a triarylphosphonium (4Z)-11,11-dialkoxy-4-undecenylide compound (4) as a reaction product (the reaction product is considered a triarylphosphonium (4Z)-11,11-dialkoxy-4-undecenylide compound (4) in the following description). Next, the reaction product mixture is subjected to a Wittig reaction condition, for example in situ, with (2E)-2-pentenal (5) and pentanal (8) to form a mixture containing a (3E,5Z,9Z)-16,16-dialkoxy-3,5,9-hexadecatriene compound (6) and a (5Z,9Z)-16,16-dialkoxy-5,9-hexadecadiene compound (9).

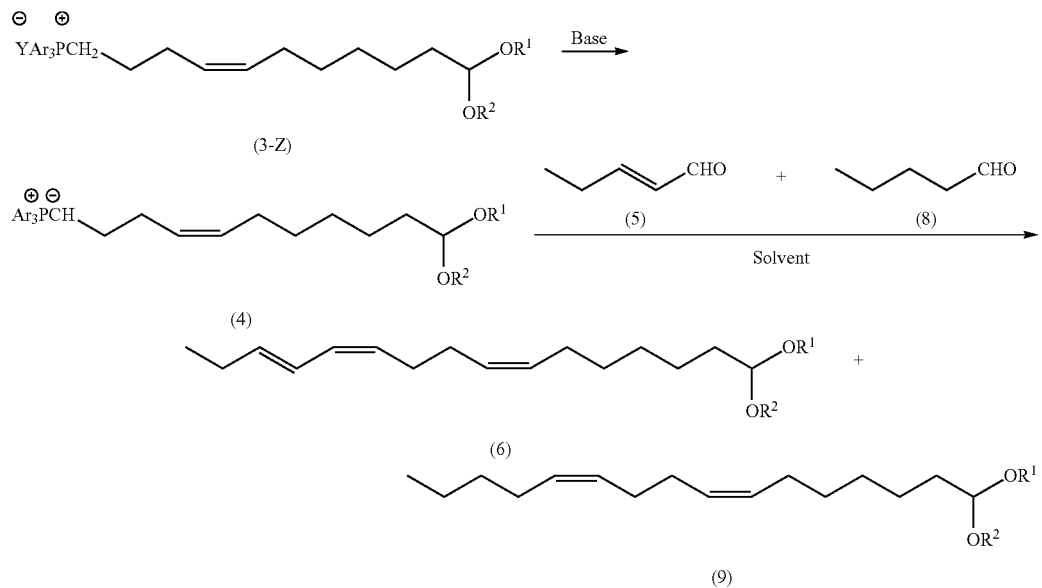

The triarylphosphonium (4Z)-11,11-dialkoxy-4-undecenylide compound (4) contained in the reaction product mixture and a process for preparing the same are as mentioned in section (C-1).

The (3E,5Z,9Z)-16,16-dialkoxy-3,5,9-hexadecatriene compound (6) prepared from (2E)-2-pentenal (5) and the reaction product mixture and the (5Z,9Z)-16,16-dialkoxy-5,9-hexadecadiene compound (9) prepared from pentanal (8) and the reaction product mixture are as mentioned in section (C-1) and section (C-2).

In the preparation of a mixture containing a (3E,5Z,9Z)-16,16-dialkoxy-3,5,9-hexadecatriene compound (6) and a (5Z,9Z)-16,16-dialkoxy-5,9-hexadecadiene compound (9), a ratio of the (3E,5Z,9Z)-16,16-dialkoxy-3,5,9-hexadecatriene compound (6) to the (5Z,9Z)-16,16-dialkoxy-5,9-hexadecadiene compound (9) can be adjusted by adjusting a ratio of (2E)-2-pentenal (5) to pentanal (8).

(2E)-2-pentenal (5) and pentanal (8) may be used as a mixture thereof or may be added separately.

D. (7Z,11Z,13E)-7,11,13-hexadecatrienal (7) and (7Z,11Z)-7,11-hexadecadienal (10) and Processes for Preparing the Same (D-1). (7Z,11Z,13E)-7,11,13-hexadecatrienal (7) and a process for preparing the same will be described below.

(7Z,11Z,13E)-7,11,13-Hexadecatrienal, which is a sex pheromone of Citrus leafminer, may be prepared by subjecting a (3E,5Z,9Z)-16,16-dialkoxy-3,5,9-hexadecatriene compound (6) to a hydrolysis reaction, as shown in the following chemical reaction formula.

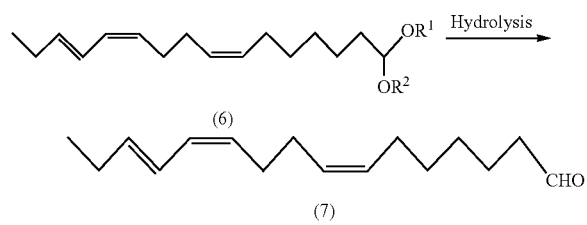

The (3E,5Z,9Z)-16,16-dialkoxy-3,5,9-hexadecatriene compound (6) and a process for preparing the same are as mentioned in section (C-1).

Hydrolysis Reaction

In the hydrolysis reaction, the (3E,5Z,9Z)-16,16-dialkoxy-3,5,9-hexadecatriene compound (6) may be of one species or of plural species, if necessary.

The hydrolysis reaction may be carried out, for example, with an acid and water.

Examples of the acid include inorganic acids such as hydrochloric acid and hydrobromic acid; p-toluenesulfonic acid, benzenesulfonic acid, trifluoroacetic acid, acetic acid, formic acid, oxalic acid, iodotrimethylsilane, and titanium tetrachloride. Acetic acid, formic acid, and oxalic acid are preferred in view of the reactivity.

The acid may be used either alone or in combination thereof, if necessary. The acid may be commercially available one.

An amount of the acid used is preferably from 0.01 to 10.0 mol, per mol of the (3E,5Z,9Z)-16,16-dialkoxy-3,5,9-hexadecatriene compound (6).

An amount of water used is preferably from 18 to 7000 g, more preferably from 18 to 3000 g, per mol of the (3E,5Z,9Z)-16,16-dialkoxy-3,5,9-hexadecatriene compound (6) in view of the reactivity.

In the hydrolysis reaction, a solvent may be further incorporated, if necessary, in addition to the acid or water.

Examples of the solvent include hydrocarbon solvents such as toluene, xylene, hexane, heptane, benzene, and cumene; ether solvents such as tetrahydrofuran, 2-methyltetrahydrofuran, diethyl ether, dibutyl ether, 4-methyltetrahydropyran, cyclopentylmethylether, and 1,4-dioxane; polar solvents such as N,N-dimethylformamide, N,N-dimethylacetamide, N-methylpyrrolidone, dimethyl sulfoxide, acetonitrile, acetone, γ-butyrolactone, dichloromethane, and chloroform; and alcoholic solvents such as methanol and ethanol.

The solvent may be used either alone or in combination thereof, if necessary. The solvent may be commercially available one.

An optimal solvent depends on an acid to be used. For example, when oxalic acid is used as an acid, tetrahydrofuran, 2-methyltetrahydrofuran, acetone, and γ-butyrolactone are preferred in view of the reactivity.

An amount of the solvent used is preferably from 0 to 7000 g, more preferably from 18 to 3000 g, per mol of the (3E,5Z,9Z)-16,16-dialkoxy-3,5,9-hexadecatriene compound (6) or the (5Z,9Z)-16,16-dialkoxy-5,9-hexadecadiene compound (9) or the mixture (see the mixture (12) described in Example 8) per total 1 mol of the (3E,5Z,9Z)-16,16-dialkoxy-3,5,9-hexadecatriene compound (6) and the (5Z,9Z)-16,16-dialkoxy-5,9-hexadecadiene compound (9) in view of the reactivity.

A reaction temperature in the hydrolysis reaction varies, depending on an acid and/or solvent to be used, and is preferably from 5 to 180° C. in view of the reactivity.

A reaction time in the hydrolysis reaction varies, depending on an acid, and/or a solvent to be used, and/or a production scale, and is preferably from 0.5 to 100 hours in view of the reactivity.

(D-2). (7Z,11Z)-7,11-hexadecadienal (10) and a process for preparing the same will be described below.

(7Z,11Z)-7,11-hexadecadienal (10), which is a sex pheromone of Citrus leafminer, may be prepared by subjecting the (5Z,9Z)-16,16-dialkoxy-5,9-hexadecadiene compound (9) to a hydrolysis reaction, as shown in the following chemical reaction formula.

An amount of water used is preferably from 18 to 7000 g, more preferably from 18 to 3000 g, per mol of the (5Z,9Z)-16,16-dialkoxy-5,9-hexadecadiene compound (9) in view of the reactivity.

In the hydrolysis reaction, a solvent may be further incorporated, if necessary, in addition to the acid or water.

The solvent is as mentioned in section (D-1).

An amount of the solvent used is preferably from 0 to 7000 g, more preferably from 18 to 3000 g, per mol of the (5Z,9Z)-16,16-dialkoxy-5,9-hexadecadiene compound (9) in view of the reactivity.

Other conditions of the hydrolysis reaction are as mentioned in section (D-1).

(D-3). A process for preparing a mixture containing (7Z,11Z,13E)-7,11,13-hexadecatrienal (7) and (7Z,11Z)-7,11-hexadecadienal (10) will be described below.

A mixture containing a (3E,5Z,9Z)-16,16-dialkoxy-3,5,9-hexadecatriene compound (6) and a (5Z,9Z)-16,16-dialkoxy-5,9-hexadecadiene compound (9) is subjected to a hydrolysis reaction to form (D-3) a mixture containing (7Z,11Z,13E)-7,11,13-hexadecatrienal (7) and (7Z,11Z)-7,11-hexadecadienal (10).

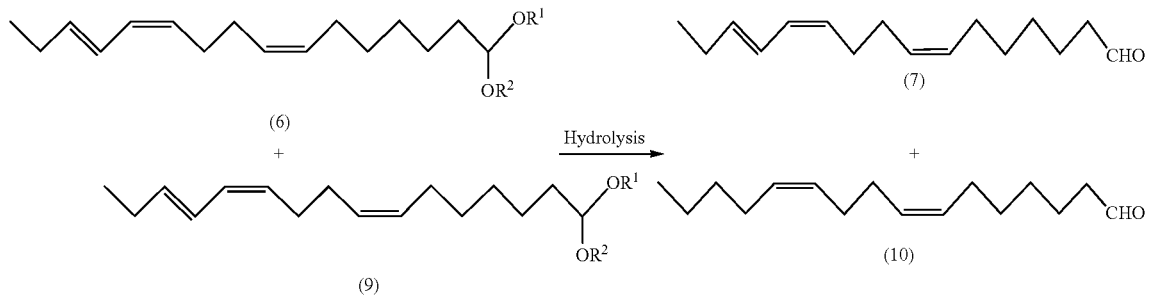

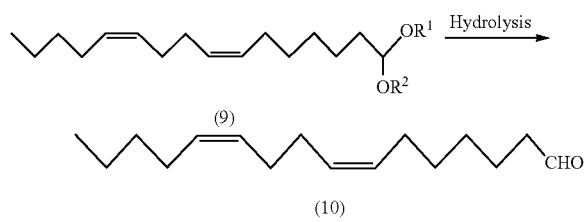

The (5Z,9Z)-16,16-dialkoxy-5,9-hexadecadiene compound (9) and a process for preparing the same are as mentioned in section (C-2).

Hydrolysis Reaction

In the hydrolysis reaction, the (5Z,9Z)-16,16-dialkoxy-5,9-hexadecadiene compound (9) may be of one species or of plural species, if necessary.

The hydrolysis reaction may be carried out, for example, with an acid and water.

The acid is as mentioned in section (D-1).

An amount of the acid used is preferably from 0.01 to 10.0 mol, per mol of the (5Z,9Z)-16,16-dialkoxy-5,9-hexadecadiene compound (9).

The process for preparing a mixture containing a (3E,5Z,9Z)-16,16-dialkoxy-3,5,9-hexadecatriene compound (6) and a (5Z,9Z)-16,16-dialkoxy-5,9-hexadecadiene compound (9) is as mentioned in section (C-3).

In the preparation of a mixture containing a (3E,5Z,9Z)-16,16-dialkoxy-3,5,9-hexadecatriene compound (6) and a (5Z,9Z)-16,16-dialkoxy-5,9-hexadecadiene compound (9), a ratio of the (3E,5Z,9Z)-16,16-dialkoxy-3,5,9-hexadecatriene compound (6) to the (5Z,9Z)-16,16-dialkoxy-5,9-hexadecadiene compound (9) may be adjusted by a ratio of a (3E,5Z,9Z)-16,16-dialkoxy-3,5,9-hexadecatriene compound (6) to a (5Z,9Z)-16,16-dialkoxy-5,9-hexadecadiene compound (9) in the mixture containing the (3E,5Z,9Z)-16,16-dialkoxy-3,5,9-hexadecatriene compound (6) and the (5Z,9Z)-16,16-dialkoxy-5,9-hexadecadiene compound (9). Therefore, for example, a mixture containing (7Z,11Z,13E)-7,11,13-hexadecatrienal (7) and (7Z,11Z)-7,11-hexadecadienal (10) at a ratio of 3:1, which is a sex pheromone composition of Citrus leafminer, may be prepared at once.

Hydrolysis Reaction

The hydrolysis reaction may be carried out, for example, with an acid and water.

The acid is as mentioned in section (D-1).

An amount of the acid used is preferably from 0.01 to 10.0 mol, per total 1 mol of the (3E,5Z,9Z)-16,16-dialkoxy-3,5,9-hexadecatriene compound (6) and the (5Z,9Z)-16,16-dialkoxy-5,9-hexadecadiene compound (9).

An amount of water used is preferably from 18 to 7000 g, more preferably from 18 to 3000 g, per total 1 mol of the (3E,5Z,9Z)-16,16-dialkoxy-3,5,9-hexadecatriene compound (6) and the (5Z,9Z)-16,16-dialkoxy-5,9-hexadecadiene compound (9) in view of the reactivity.

In the hydrolysis reaction, a solvent may be further used incorporated, if necessary, in addition to the acid or water.

The solvent is as mentioned in section (D-1).

An amount of the solvent used is preferably from 0 to 7000 g, more preferably from 18 to 3000 g, per total 1 mol of the ((3E,5Z,9Z)-16,16-dialkoxy-3,5,9-hexadecatriene compound (6) and the (5Z,9Z)-16,16-dialkoxy-5,9-hexadecadiene compound (9) in view of the reactivity.

Other conditions of the hydrolysis reaction are as mentioned in section (D-1).

EXAMPLES

The present invention will be described with reference to the following Examples. It should be construed that the present invention is not limited to or by the Examples.

The term "purity" used herein means an area percentage in gas chromatography (GC), unless otherwise specified. The term "production ratio" means a ratio of area percentages in GC. The term "yield" is calculated from the area percentages determined by GC.

In the Examples, monitoring of the reactions and calculation of the yields were carried out in the following GC conditions.

GC conditions: GC: Capillary gas chromatograph GC-2014 (Shimadzu Corporation); column: DB-WAX (DB-5), 0.25 μm×0.25 mmϕ×30 m, carrier gas: He (1.55 mL/min), detector: FID; column temperature: 150° C., elevated by 5° C./min, up to 230° C.

The yield was calculated according to the following equation in consideration of purities (% GC) of a starting material and a product.

Yield(%)=[(mass of a product obtained in a reaction x % GC)/molecular mass of a product]÷[(mass of a starting material x % GC)/molecular mass of a starting material]}×100

THE represents tetrahydrofuran, P-2 Ni represents P-2 type nickel boride, EDA represents ethylenediamine, Me represents a methyl group, Et represents an ethyl group, ᵗBu represents a tert-butyl group, and Ph represents a phenyl group.

Example 1: Preparation of (7Z)-11-chloro-1,1-dimethoxy-7-undecyne (17: $X^1$=Cl, $R^1$=$R^2$=Me)

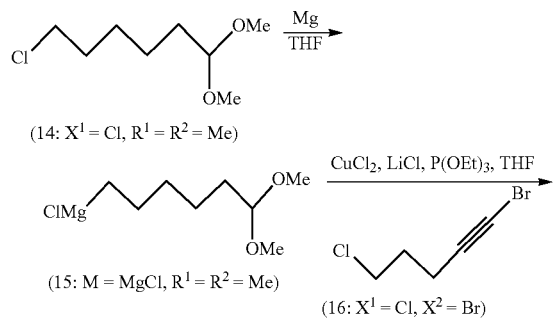

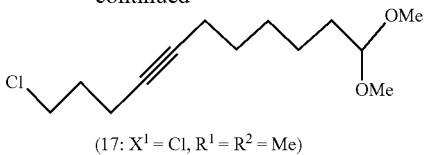

Magnesium (51.64 g, 2.13 gram atoms) and tetrahydrofuran (607.20 g) were placed in a reactor at room temperature and stirred at 60 to 65° C. for 31 minutes. After the completion of the stirring, 6-chloro-1,1-dimethoxyhexane (14: $X^1$=Cl, $R^1$=$R^2$=Me) (367.17 g, 2.02 mol, purity 99.59%) was added dropwise at 60 to 75° C. After the completion of the dropwise addition, the mixture was stirred at 75 to 80° C. for 2 hours to prepare 6,6-dimethoxyhexyl-magnesium chloride (15: M=MgCl, $R^1$=$R^2$=Me).

Subsequently, cupric chloride (3.24 g, 0.024 mol), lithium chloride (2.04 g, 0.048 mol), triethyl phosphite (16.11 g, 0.097 mol), tetrahydrofuran (306.53 g), and 1-bromo-5-chloro-1-pentyne (16: $X^1$=Cl, $X^2$=Br) (340.14 g, 1.86 mol, purity 99.34%) were placed in another reactor, and 6,6-dimethoxyhexylmagnesium chloride (15: M=MgCl, $R^1$=$R^2$=Me) prepared above was added dropwise at 15 to 30° C. After the completion of the dropwise addition, the mixture was stirred at 25 to 35° C. for 1.5 hours. Next, an aqueous solution of acetic acid (prepared from acetic acid (253.00 g) and water (759.00 g)) was added to the reaction mixture, followed by phase separation and removal of the aqueous phase. The resulting organic phase was washed with an aqueous solution (520.00 g) of sodium hydroxide (3.25 mol) and then concentrated at a reduced pressure. The concentrate was subjected to distillation at a reduced pressure to obtain (7Z)-11-chloro-1,1-dimethoxy-7-undecyne (17: $X^1$=Cl, $R^1$=$R^2$=Me) (425.97 g, 1.64 mol, purity 95.12%, b.p.=123.0 to 131.1° C./0.40 kPa (3.0 mmHg)) in a yield of 88.18%.

The following are spectrum data of (7Z)-11-chloro-1,1-dimethoxy-7-undecyne (17: $X^1$=Cl, $R^1$=$R^2$=Me) thus prepared.

Nuclear magnetic resonance spectrum: $^1$H-NMR (500 MHz, CDCl$_3$): δ=1.30-1.42 (4H, m), 1.47 (2H, quin-like, J=7.3 Hz), 1.59 (2H, dt, J=9.2 Hz, 5.7 Hz), 1.91 (2H, tt, J=6.5 Hz, 6.5 Hz), 2.13 (2H, tt, J=7.3 Hz, 2.3 Hz), 2.32 (2H, tt, J=6.9 Hz, 2.3 Hz), 3.30 (6H, s), 3.63 (2H, t, J=6.5 Hz), 4.34 (1H, t, J=6.1 Hz); $^{13}$C-NMR (500 MHz, CDCl$_3$): δ=16.16, 18.58, 24.10, 28.62, 28.88, 31.74, 32.37, 43.75, 52.60, 78.10, 81.19, 104.45.

Mass spectrum: EI-mass spectrum (70 eV): m/z 245 (M$^+$−1), 215, 185, 137, 119, 105, 91, 75.

Infrared absorption spectrum (D-ATR): νmax=2938, 2860, 1457, 1437, 1386, 1291, 1192, 1127, 1076, 1053, 969, 910, 652.

Example 2: Preparation of (7Z)-11-chloro-1,1-diethoxy-7-undecyne (17: $X^1$=Cl, $R^1$=$R^2$=Et)

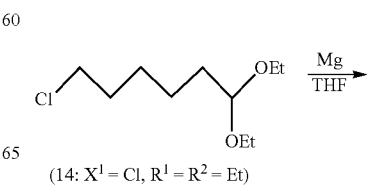

39

-continued

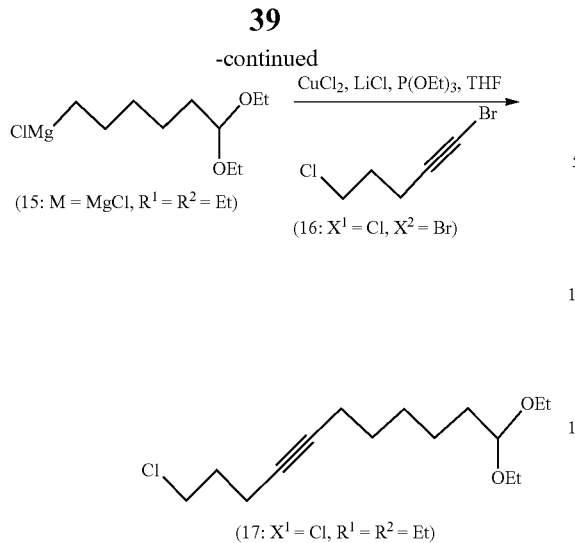

Magnesium (89.30 g, 3.67 grams atoms) and tetrahydrofuran (1050.00 g) were placed in a reactor at room temperature and stirred at 60 to 65° C. for 17 minutes. After the completion of the stirring, 6-chloro-1,1-diethoxyhexane (14: $X^1$=Cl, $R^1$=$R^2$=Et) (744.93 g, 3.50 mol, purity 98.08%) was added dropwise at 60 to 75° C. After the completion of the dropwise addition, the mixture was stirred at 75 to 80° C. for 2 hours to prepare 6,6-diethoxyhexylmagnesium chloride (15: M=MgCl, $R^1$=$R^2$=Et).

Subsequently, cupric chloride (5.60 g, 0.042 mol), lithium chloride (3.54 g, 0.084 mol), triethyl phosphite (27.86 g, 0.17 mol), tetrahydrofuran (530.08 g), and 1-bromo-5-chloro-1-pentyne (16: $X^1$=Cl, $X^2$=Br) (584.30 g, 3.22 mol, purity 100%) were placed in another reactor, and 6,6-diethoxyhexylmagnesium chloride (15: M=MgCl, $R^1$=$R^2$=Et) prepared above was added dropwise at 15 to 30° C. After the completion of the dropwise addition, the mixture was stirred at 25 to 35° C. for 1.5 hours. Next, an aqueous solution of acetic acid (prepared from acetic acid (437.50 g) and water (1312.50 g)) was added to the reaction mixture, followed by phase separation and removal of the aqueous phase. The resulting organic phase was washed with an aqueous solution (900.00 g) of sodium hydroxide (5.63 mol) and concentrated at a reduced pressure. The concentrate was subjected to distillation at a reduced pressure to obtain (7Z)-11-chloro-1,1-diethoxy-7-undecyne (17: $X^1$=Cl, $R^1$=$R^2$=Et) (798.79 g, 2.71 mol, purity 93.24%, b.p.=148.1 to 154.2° C./0.40 kPa (3.0 mmHg)) in a yield of 84.25%.

The following are spectrum data of (7Z)-11-chloro-1,1-diethoxy-7-undecyne (17: $X^1$=Cl, $R^1$=$R^2$=Et) thus prepared.

Nuclear magnetic resonance spectrum: $^1$H-NMR (500 MHz, CDCl$_3$): δ=1.19 (6H, t, J=7.3 Hz), 1.29-1.42 (2H, m), 1.47 (2H, quin-like, J=7.3 Hz), 1.60 (2H, dt, J=9.2 Hz, 5.8 Hz), 1.91 (2H, tt, J=6.5 Hz), 2.13 (2H, tt, J=6.5 Hz), 2.13 (2H, tt, J=7.3 Hz, 2.3 Hz), 2.32 (2H, tt, J=6.9 Hz, 2.3 Hz), 3.47 (2H, tt, J=8.2 Hz, 6.9 Hz), 3.59-3.66 (4H, m), 4.46 (1H, t, J=5.8 Hz); $^{13}$C-NMR (500 MHz, CDCl$_3$): δ=15.32, 16.16, 18.58, 24.25, 28.64, 28.90, 31.72, 33.47, 43.76, 60.84, 78.05, 81.23, 102.82.

Mass spectrum: EI-mass spectrum (70 eV): m/z 273 (M$^+$−1), 229, 183, 165, 151, 137, 123, 103, 57.

Infrared absorption spectrum (D-ATR): νmax=2974, 2932, 2862, 1442, 1374, 1345, 1291, 1128, 1061, 1001, 653.

40

Example 3: Preparation of 11-chloro-1,1-dimethoxy-7-undecene (1-Z: $X^1$=Cl, $R^1$=$R^2$=Me)

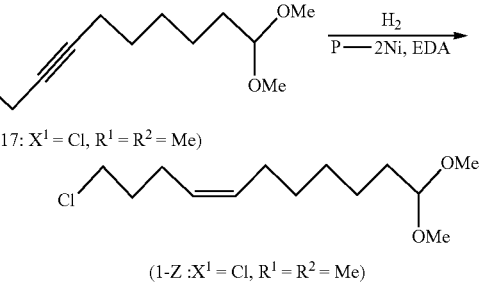

(7Z)-11-chloro-1,1-methoxy-7-undecyne (17: $X^1$=Cl, $R^1$=$R^2$=Me) obtained in Example 1 (788.66 g, 3.04 mol, purity 95.12%), P-2 Ni catalyst (381.12 g, 0.096 mol of Ni), and EDA (8.32 g) were placed in a reactor at room temperature, to which a hydrogen gas was fed, while stirring at 45 to 55° C. for 11.5 hours. The conversion was confirmed to be 100% by GC, and then water (132.98 g) was added to the reaction mixture, followed by phase separation and removal of the aqueous phase to obtain the organic phase. The resulting organic phase was concentrated at a reduced pressure. The concentrate was subjected to distillation at a reduced pressure to obtain 11-chloro-1,1-dimethoxy-7-undecene (1-Z: $X^1$=Cl, $R^1$=$R^2$=Me) (785.92 g, 2.88 mol, purity 91.17%, b.p.=123.1 to 142.1° C./0.40 kPa (3.0 mmHg)) in a yield of 94.74%.

The following are spectrum data of 11-chloro-1,1-dimethoxy-7-undecene (1-Z: $X^1$=Cl, $R^1$=$R^2$=Me) thus prepared.

Nuclear magnetic resonance spectrum: $^1$H-NMR (500 MHz, CDCl$_3$): δ=1.24-1.39 (6H, m), 1.55-1.61 (2H, m), 1.81 (2H, dt, J=6.9 Hz, 6.9 Hz), 2.04 (2H, q-like, J=6.9 Hz), 2.18 (2H, dt, J=7.3 Hz, 7.3 Hz), 3.30 (6H, s), 3.52 (2H, t, J=6.5 Hz), 4.35 (1H, t, J=5.7 Hz), 5.30 (1H, dtt, J=10.7 Hz, 7.3 Hz, 1.5 Hz), 5.42 (1H, dtt, J=10.7 Hz, 7.3 Hz, 1.5 HZ); $^{13}$C-NMR (500 MHz, CDCl$_3$): δ=24.33, 24.44, 27.08, 29.06, 29.54, 32.41, 32.43, 44.46, 52.55, 104.47, 127.63, 131.45.

Mass spectrum: EI-mass spectrum (70 eV): m/z 247 (M$^+$−1), 217, 184, 158, 134, 121, 97, 75, 55, 41.

Infrared absorption spectrum (D-ATR): νmax=2932, 2857, 1457, 1444, 1127, 1074, 1055, 965, 912, 726, 653.

Example 4: Preparation of 11-chloro-1,1-diethoxy-7-undecene (1-Z: $X^1$=Cl, $R^1$=$R^2$=Et)

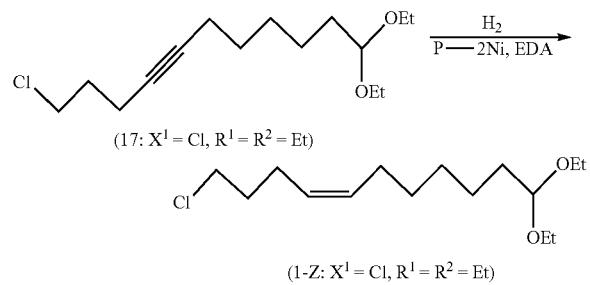

(7Z)-11-chloro-1,1-ethoxy-7-undecyne (17: X¹=Cl, R¹=R²=Et) obtained in Example 2 (798.79 g, 2.71 mol, purity 93.24%) and P-2 Ni catalyst (339.53 g, 0.10 mol of Ni), and EDA (7.43 g) were placed in a reactor at room temperature, to which a hydrogen gas was fed, while stirring at 45 to 55° C. for 10 hours. The conversion was confirmed to be 100% by GC, and then water (118.46 g) was added to the reaction mixture, followed by phase separation and removal of the aqueous phase to obtain the organic phase. The resulting organic phase was concentrated at a reduced pressure. The concentrate was subjected to distillation at a reduced pressure to obtain 11-chloro-1,1-diethoxy-7-undecene (1-Z: X¹=Cl, R¹=R²=Et) (781.02 g, 2.49 mol, purity 88.26%, b.p.=150.0 to 165.0° C./0.40 kPa (3.0 mmHg)) in 91.79% yield. The product contained, as an impurity, 1-ethoxy-11-chloro-1,7-undecadiene (0.061 mol, content of 1.8%) that resulted from elimination of ethanol from the ethoxy moiety of (7Z)-11-chloro-1,1-ethoxy-7-undecyne (17: X¹=Cl, R¹=R²=Et) during distillation.

The following are spectrum data of 11-chloro-1,1-diethoxy-7-undecene (1-Z: X¹=Cl, R¹=R²=Et) thus prepared.

Nuclear magnetic resonance spectrum: ¹H-NMR (500 MHz, CDCl₃): δ=1.19 (6H, t, J=6.9 Hz), 1.26-1.39 (6H, m), 1.56-1.64 (2H, m), 1.81 (2H, tt, J=6.9 Hz, 6.9 Hz), 2.03 (2H, q-like, J=6.9 Hz), 2.18 (2H, dt, J=7.1 Hz, 7.1 Hz), 3.48 (2H, dt, J=9.4 Hz, 7.3 Hz), 3.52 (2H, t, J=6.9 Hz), 3.62 (2H, dq, J=9.4 Hz, 7.3 Hz), 4.46 (1H, t, J=5.7 Hz), 5.29 (1H, dtt, J=10.7 Hz, 7.3 Hz, 1.5 Hz), 5.41 (1H, dtt, J=10.7 Hz, 7.3 Hz, 1.5 Hz); ¹³C-NMR (500 MHz, CDCl₃): δ=15.32, 24.31, 24.59, 27.10, 29.07, 29.55, 32.42, 33.51, 44.46, 60.78, 102.86, 127.58, 131.49.

Mass spectrum: EI-mass spectrum (70 eV): m/z 275 (M⁺-1), 231, 185, 148, 103, 85, 57, 41.

Infrared absorption spectrum (D-ATR): νmax=2975, 2930, 2858, 1444, 1373, 1344, 1128, 1062, 1001, 727, 653.

[0168]

Example 5: Preparation of (3E,5Z,9Z)-16,16-dimethoxy-3,5,9-hexadecatriene (6: R¹=R²=Me)

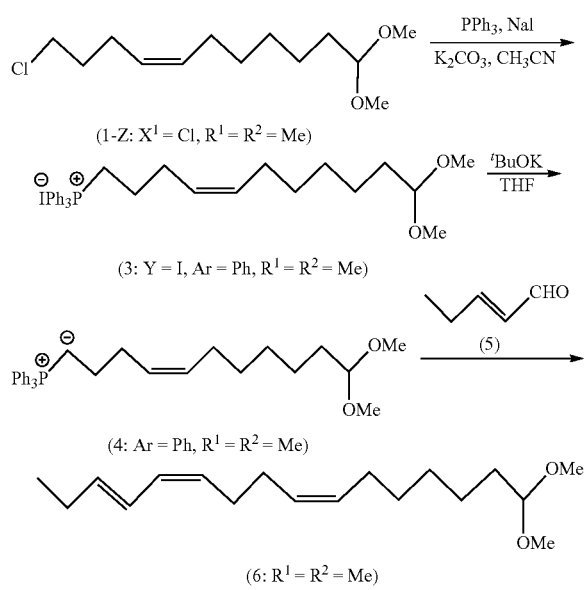

11-Chloro-1,1-dimethoxy-7-undecene (1-Z: X¹=Cl, R¹=R²=Me) obtained in Example 3 (261.97 g, 0.96 mol, purity 91.17%), triphenylphosphine (2: Ar=Ph) (252.40 g, 0.96 mol), sodium iodide (155.89 g, 1.04 mol), potassium carbonate (7.74 g, 0.056 mol), and acetonitrile (360.00 g) were placed in a reactor at room temperature and stirred at 75 to 85° C. for 16 hours to prepare (4Z)-11,11-dimethoxy-4-undecenyltriphenylphosphonium iodide (3: Y=I, Ar=Ph, R¹=R²=Me).

Next, tetrahydrofuran (640.00 g) was added dropwise to the reactor at 30 to 40° C. After the completion of the dropwise addition, the reaction mixture was cooled to 0 to −15° C. Subsequently, potassium tert-butoxide (103.23 g, 0.92 mol) was added, and the mixture was then stirred for 1 hour to obtain a reaction product mixture. The reaction product mixture is estimated to contain triphenylphosphonium (4Z)-11,11-dimethoxy-4-undecenylide (4: Ar=Ph, R¹=R²=Me) as a reaction product.

Then, (2E)-2-pentenal (5) (68.09 g, 0.80 mol, purity 98.84%, 2E:2Z=98.7:1.3) was added dropwise to the reactor at −70 to −60° C. After the completion of the dropwise addition, the mixture was stirred at 20 to 30° C. for 12 hours. Subsequently, brine (prepared from sodium chloride (121.26 g) and water (1212.40 g)) was added to the reaction mixture, followed by phase separation and removal of the aqueous phase to obtain the organic phase. The organic phase was concentrated at a reduced pressure to obtain a crude product, (3E,5Z,9Z)-16,16-dimethoxy-3,5,9-hexadecatriene (6: R¹=R²=Me) (228.31 g, 0.77 mol, purity 94.02%, 3E5Z9Z:3E5E9Z=92.2:7.8) in a crude yield of 95.68%.

The following are spectrum data of (4Z)-11,11-dimethoxy-4-undecenyltriphenylphosphonium iodide (3: Y=I, Ar=Ph, R¹=R²=Me) thus prepared.

Nuclear magnetic resonance spectrum: ¹H-NMR (500 MHz, CDCl₃): δ=1.22-1.34 (6H, m), 1.45-1.54 (2H, m), 1.64 (2H, sext-like, J=7.6 Hz), 1.99 (2H, dt, J=6.9 Hz, 6.9 Hz), 2.24 (2H, dt, J=7.3 Hz, 7.3 Hz), 3.23 (6H, s), 3.20-3.28 (2H, m), 4.29 (1H, t, J=5.7 Hz), 5.31 (1H, dtt, J=10.7 Hz, 7.3 Hz, 1.5 Hz), 5.45 (1H, dtt, J=10.7 Hz, 7.3 Hz, 1.2 Hz), 7.68-7.75 (12H, m), 7.83-7.89 (3H, m); ¹³C-NMR (500 MHz, CDCl₃): δ=0.80, 0.76, 1.13, 1.30, 1.47, 1.63, 1.80, 105.42, 118.87, 119.56, 131.12, 131.22, 134.54, 134.62, 136.00, 136.03.

Infrared absorption spectrum (D-ATR): νmax=2930, 2856, 1438, 1161, 1113, 1055, 996, 736, 723, 691, 531, 509.

The following are spectrum data of (3E,5Z,9Z)-16,16-dimethoxy-3,5,9-hexadecatriene (6: R¹=R²=Me) thus prepared.

Nuclear magnetic resonance spectrum: ¹H-NMR (500 MHz, CDCl₃): δ=1.01 (3H, t, J=7.3 Hz), 1.24-1.39 (6H, m), 1.55-1.61 (2H, m), 2.03 (2H, q-like, J=6.9 Hz), 2.12 (4H, quin-like, J=7.3 Hz), 2.21 (2H, dt, J=7.7 Hz, 7.7 Hz), 3.30 (6H, s), 4.35 (1H, t, J=5.7 Hz), 5.30 (1H, dt, J=10.7 Hz, 7.3 Hz), 5.33-5.41 (2H, m), 5.70 (1H, dt, J=14.9 Hz, 6.5 Hz), 5.96 (1H, dd, J=11.1 Hz, 11.1 Hz), 6.29 (1H, dddt, J=14.9 Hz, 11.1 Hz, 1.5 Hz, 1.5 Hz); ¹³C-NMR (500 MHz, CDCl₃): δ=13.59, 24.47, 25.85, 27.14, 27.32, 27.80, 29.10, 29.59, 32.42, 52.53, 104.47, 124.59, 128.93, 129.02, 129.22, 130.33, 136.38.

Mass spectrum: EI-mass spectrum (70 eV): m/z 280 (M⁺-1), 248, 217, 166, 121, 94, 75.

Infrared absorption spectrum (D-ATR): νmax=2932, 2856, 1460, 1385, 1127, 1077, 1056, 982, 947, 737.

Example 6: Preparation of (3E,5Z,9Z)-16,16-diethoxy-3,5,9-hexadecatriene (6: $R^1=R^2=Et$)

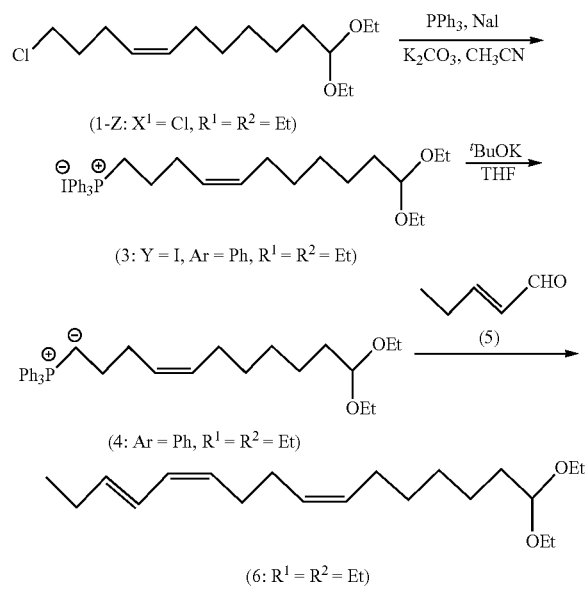

11-Chloro-1,1-diethoxy-7-undecene (1-Z: $X^1=Cl$, $R^1=R^2=Et$) (436.61 g, 1.39 mol, purity 88.26%) containing 1-ethoxy-11-chloro-1,7-undecadiene (0.034 mol, content 1.8%) obtained in Example 4, triphenylphosphine (2: Ar=Ph) (374.92 g, 1.46 mol), sodium iodide (232.33 g, 1.55 mol), potassium carbonate (12.00 g, 0.087 mol), and acetonitrile (558.00 g) were placed in a reactor at room temperature and stirred at 75 to 85° C. for 15.5 hours to prepare (4Z)-11,11-diethoxy-4-undecenyltriphenylphosphonium iodide (3: Y=I; Ar=Ph, $R^1=R^2=Et$).

Next, tetrahydrofuran (992.00 g) was added dropwise to the reactor at 30 to 40° C. After the completion of the dropwise addition, the reaction mixture was cooled to 5 to −10° C. Subsequently, potassium tert-butoxide (153.05 g, 1.36 mol) was added, and the reaction mixture was then stirred for 1 hour to obtain a reaction product mixture. The reaction product mixture is estimated to contain triphenylphosphonium (4Z)-11,11-diethoxy-4-undecenylide (4: Ar=Ph, $R^1=R^2=Et$) as a reaction product.

Then, (2E)-2-pentenal (5) (106.27 g, 1.24 mol, purity 98.15%, 2E:2Z=98.7:1.3) was added dropwise to the reactor at −10 to 5° C. After the completion of the dropwise addition, the mixture was stirred at 15 to 25° C. for 2 hours. Subsequently, brine (prepared from sodium chloride (187.95 g) and water (1879.22 g)) was added to the reaction mixture, followed by phase separation and removal of the aqueous phase to obtain the organic phase. The organic phase was concentrated at a reduced pressure to obtain a crude product, (3E,5Z,9Z)-16,16-dimethoxy-3,5,9-hexadecatriene (6: $R^1=R^2=Et$) (375.58 g, 0.91 mol, purity 74.36%, 3E5Z9Z: 3E5E9Z=87.4:12.6) in a crude yield of 73.01%. The crude product contained, as an impurity, (7Z,11Z,13E)-1-ethoxy-1,7,11,13-hexadecatetraene (0.037 mol, content 2.6%) derived from 1-ethoxy-11-chloro-1,7-undecadiene.

The following are spectrum data of (4Z)-11,11-diethoxy-4-undecenyltriphenylphosphonium iodide (3: Y=I, Ar=Ph, $R^1=R^2=Et$) thus prepared.

Nuclear magnetic resonance spectrum: $^1$H-NMR (500 MHz, CDCl$_3$): δ=1.11 (6H, t, J=7.3 Hz), 1.21-1.36 (6H, m), 1.48 (2H, dt, J=8.8 Hz, 5.7 Hz), 1.65 (2H, sext-like, J=7.7 Hz), 1.99 (2H, dt, J=7.3 Hz, 7.3 Hz), 2.24 (2H, dt, J=7.3 Hz, 7.3 Hz), 3.20-3.28 (2H, m), 3.42 (2H, dq, J=7.3 Hz, 9.6 Hz), 3.57 (2H, dq, J=6.9 Hz, 9.6 Hz), 4.41 (1H, t, J=5.8 Hz), 5.31 (1H, dtt, J=10.7 Hz, 7.3 Hz, 1.5 Hz), 5.45 (1H, dtt, J=11.1 Hz, 7.3 Hz, 1.5 Hz), 7.68-7.75 (12H, m), 7.83-7.88 (3H, m); $^{13}$C-NMR (500 MHz, CDCl$_3$): δ=0.80, 0.97, 1.14, 1.30, 1.46, 1.63, 1.80, 15.68, 29.73, 34.48, 103.70, 118.87, 119.56, 131.12, 131.22, 134.54, 134.2.

Infrared absorption spectrum (D-ATR): vmax=2973, 2927, 2858, 1587, 1438, 1373, 1113, 1060, 996, 737, 723, 691, 530, 509.

The following are spectrum data of (3E,5Z,9Z)-16,16-diethoxy-3,5,9-hexadecatriene (6: $R^1=R^2=Et$) thus prepared.

Nuclear magnetic resonance spectrum: $^1$H-NMR (500 MHz, CDCl$_3$): δ=1.01 (3H, t, J=7.3 Hz), 1.20 (6H, t, J=7.3 Hz), 1.29-1.39 (6H, m), 1.57-1.63 (2H, m), 2.02 (2H, q-like, J=6.5 Hz), 2.12 (4H, tt, J=7.7 Hz, 7.7 Hz), 2.21 (2H, dt, J=7.3 Hz, 7.3 Hz), 3.48 (2H, dq, J=9.4 Hz, 7.3 Hz), 3.63 (2H, dq, J=9.4 Hz, 7.3 HZ), 4.47 (1H, t, J=5.7 Hz), 5.30 (1H, dt, J=10.7 Hz, 7.3 Hz), 5.37 (2H, dt, J=5.8 Hz, 3.5 Hz), 5.70 (1H, dt, J=14.9 Hz, 6.9 Hz), 5.96 (1H, dd, J=11.1 Hz, 11.1 Hz), 6.29 (1H, dddt, J=14.9 Hz, 11.1 Hz, 1.5 Hz, 1.5 Hz); $^{13}$C-NMR (500 MHz, CDCl$_3$): δ=13.59, 15.33, 24.63, 25.85, 27.15, 27.31, 27.79, 29.10, 29.59, 33.51, 60.76, 102.87, 124.58, 128.91, 128.97, 129.23, 130.37, 136.38.

Mass spectrum: EI-mass spectrum (70 eV): m/z 307 ($M^+$−1), 262, 217, 121, 95, 67, 41.

Infrared absorption spectrum (D-ATR): vmax=2973, 2930, 2857, 1457, 1443, 1373, 1344, 1128, 1062, 983, 946, 737.

Example 7: Preparation of (5Z,9Z)-16,16-dimethoxy-5,9-hexadecadiene (9: $R^1=R^2=Me$)

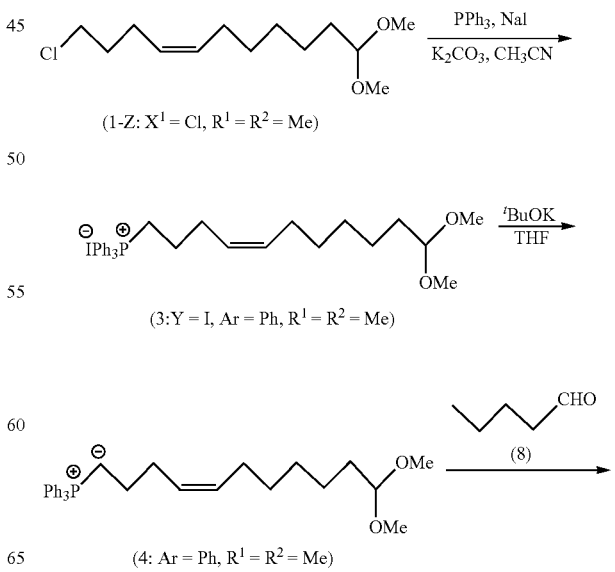

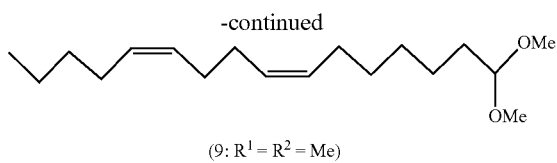

(9: $R^1 = R^2 = Me$)

11-Chloro-1,1-dimethoxy-7-undecene (1-Z: $X^1$=Cl, $R^1$=$R^2$=Me) obtained in Example 3 (130.99 g, 0.48 mol, purity 91.17%), triphenylphosphine (2: Ar=Ph) (126.20 g, 0.48 mol), sodium iodide (77.94 g, 0.52 mol), potassium carbonate (3.87 g, 0.028 mol), and acetonitrile (180.00 g) were placed in a reactor at room temperature and stirred at 75 to 85° C. for 17 hours to prepare (4Z)-11,11-dimethoxy-4-undecenyltriphenylphosphonium iodide (3: Y=I, Ar=Ph, $R^1$=$R^2$=Me).

Next, tetrahydrofuran (320.00 g) was added dropwise to the reactor at 30 to 40° C. After the completion of the dropwise addition, the reaction mixture was cooled to 0 to m), 1.55-1.62 (2H, m), 1.99-2.05 (4H, m), 2.05-2.09 (4H, m), 3.30 (6H, s), 4.35 (1H, t, J=6.1 Hz), 5.32-5.42 (4H, m); $^{13}$C-NMR (500 MHz, CDCl$_3$): δ=13.97, 22.32, 24.48, 26.93, 27.13, 27.36, 27.40, 29.11, 29.61, 31.90, 32.43, 52.53, 104.48, 129.09, 129.28, 130.12, 130.31.

Mass spectrum: EI-mass spectrum (70 eV): m/z 281 ($M^+$–1), 250, 219, 149, 136, 121, 108, 93, 75, 55, 41.

Infrared absorption spectrum (D-ATR): vmax=2928, 2857, 1463, 1385, 1128, 1078, 1056, 966, 728.

Example 8: Preparation of a mixture (12) of (3E, 5Z,9Z)-16,16-dimethoxy-3,5,9-hexadecatriene (6: $R^1$=$R^2$=Me) and (5Z,9Z)-16,16-dimethoxy-5,9-hexadecadiene (9: $R^1$=$R^2$=Me)

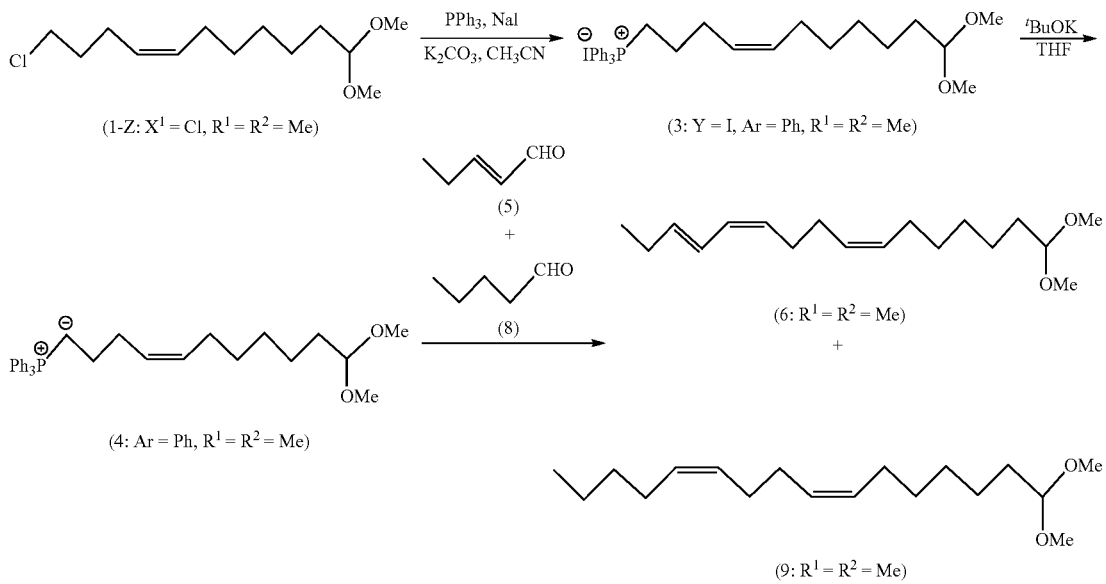

–15° C. Subsequently, potassium t-butoxide (51.62 g, 0.46 mol) was added, and the mixture was then stirred for 1 hour to obtain a reaction product mixture. The reaction product mixture is estimated to contain triphenylphosphonium (4Z)-11,11-dimethoxy-4-undecenylide (4: Ar=Ph, $R^1$=$R^2$=Me) as a reaction product.

Subsequently, pentanal (8) (36.27 g, 0.40 mol, purity 95.00%) was added dropwise to the reactor at –70 to –60° C. After the completion of the dropwise addition, the mixture was stirred at 20 to 30° C. for 12 hours. Subsequently, brine (prepared from sodium chloride (60.63 g) and water (606.20 g)) was added to the reaction mixture, followed by phase separation and removal of the aqueous phase to obtain the organic phase. The organic phase was concentrated at a reduced pressure to obtain a crude product, (5Z,9Z)-16,16-dimethoxy-5,9-hexadecadiene (9: $R^1$=$R^2$=Me) (117.29 g, 0.38 mol, purity 90.59%, the 5Z9Z-form and the 5E9Z-form were not separated by GC) in a crude yield of 94.04%.

The following are spectrum data of (5Z,9Z)-16,16-dimethoxy-5,9-hexadecadiene (9: $R^1$=$R^2$=Me) thus prepared.

Nuclear magnetic resonance spectrum: $^1$H-NMR (500 MHz, CDCl$_3$): δ=0.89 (3H, t, J=7.3 Hz), 1.24-1.39 (10H, 11-Chloro-1,1-dimethoxy-7-undecene (1-Z: $X^1$=Cl, $R^1$=$R^2$=Me) obtained in Example 3 (44.75 g, 0.16 mol, purity 91.17%), triphenylphosphine (2: Ar=Ph) (43.13 g, 0.16 mol), sodium iodide (26.64 g, 0.18 mol), potassium carbonate (1.32 g, 0.0096 mol), and acetonitrile (61.52 g) were placed in a reactor at room temperature and stirred at 75 to 85° C. for 15.5 hours to prepare (4Z)-11,11-dimethoxy-4-undecenyltriphenylphosphonium iodide (3: Y=I, Ar=Ph, $R^1$=$R^2$=Me).

Next, tetrahydrofuran (109.36 g) was added dropwise to the reactor at 30 to 40° C. After the completion of the dropwise addition, the reaction mixture was cooled to 0 to –15° C. Subsequently, potassium t-butoxide (17.64 g, 0.16 mol) was added, and the mixture was then stirred for 1 hour to obtain a reaction product mixture. The reaction product mixture is estimated to contain triphenylphosphonium (4Z)-11,11-dimethoxy-4-undecenylide (4: Ar=Ph, $R^1$=$R^2$=Me) as a reaction product.

Subsequently, the mixture (11) of (2E)-2-pentenal (5) (8.72 g, 0.10 mol, purity 98.84%) and pentanal (8) (3.10 g, 0.034 mol, purity 95.00%) was added dropwise to the reactor at −70 to −60° C. After the completion of the dropwise addition, the mixture was stirred at 20 to 30° C. for 12 hours. Subsequently, brine (prepared from sodium chloride (20.72 g) and water (207.17 g)) was added to the reaction mixture, followed by phase separation and removal of the aqueous phase to obtain the organic phase. The organic phase was concentrated at a reduced pressure to obtain a mixture (12) of (3E,5Z,9Z)-16,16-dimethoxy-3,5,9-hexadecatriene (6: $R^1=R^2=$Me) (40.84 g, 0.092 mol, content 63.06%, 3E5Z9Z:3E5E9Z=90.9:9.1) and (5Z,9Z)-16,16-dimethoxy-5,9-hexadecadiene (9: $R^1=R^2=$Me) (40.84 g, 0.30 mol, content 20.59%, the 5Z9Z-form and the 5E9Z-form were not separated by GC) in a crude yield of 88.97%.

The spectrum data of (3E,5Z,9Z)-16,16-dimethoxy-3,5,9-hexadecatriene (6: $R^1=R^1=$Me) and (5Z,9Z)-16,16-dimethoxy-5,9-hexadecadiene (9: $R^1=R=$Me) thus prepared were same as those determined in Example 5 and Example 7, respectively.

Example 9: Preparation of (7Z,11Z,13E)-7,11,13-hexadecatrienal (7)

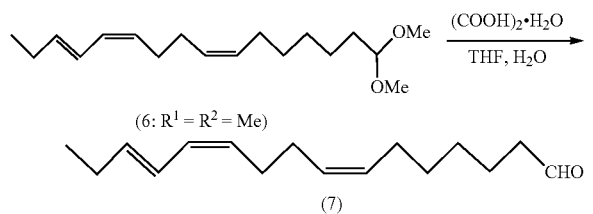

The crude product (3E,5Z,9Z)-16,16-dimethoxy-3,5,9-hexadecatriene (6: $R^1=R^2=$Me) obtained in Example 5 (228.31 g, 0.77 mol, purity 94.02%, 3E5Z9Z:3E5E9Z=92.2:7.8), oxalic acid dihydrate (289.48 g, 2.30 mol), tetrahydrofuran (765.40 g), and pure water (765.40 g) were placed in a reactor and stirred at 60 to 65° C. for 3.5 hours. The reaction mixture was cooled to 50° C., and hexane (225.10 g) was added. The mixture was stirred for 30 minutes. After the completion of the stirring, the reaction mixture was left to stand for phase separation, followed by removal of the aqueous phase to obtain the organic phase. The organic phase was concentrated at a reduced pressure, and the concentrate was distilled at a reduced pressure (125.0 to 134.5° C./0.40 kPa (3.0 mmHg)) to obtain (7Z,11Z,13E)-7,11,13-hexadecatrienal (7) (159.21 g, 0.64 mol, purity 94.47%, 7Z11Z13E:7Z11E13E=91.6:8.4) in an overall yield of Example 5 and Example 9 of 80.21%. (7Z,11Z,13E)-7,11,13-hexadecatrienal (7) was obtained from the starting material, 1-bromo-5-chloro-1-pentyne (16: $X^1=$Cl, $X^2=$Br), in an overall yield through Examples 1, 3, 5, and 9 of 67.01%.

The following are spectrum data of (7Z,11Z,13E)-7,11,13-hexadecatrienal (7) thus prepared.

Nuclear magnetic resonance spectrum: $^1$H-NMR (500 MHz, CDCl$_3$): δ=1.01 (3H, t, J=7.3 Hz), 1.29-1.41 (4H, m), 1.63 (2H, quin-like, J=7.3 Hz), 2.04 (2H, q-like, J=6.9 Hz), 2.08-2.15 (4H, m), 2.21 (2H, dt, J=7.3 Hz, 7.3 Hz), 2.41 (2H, dt, J=1.9 Hz, 7.3 Hz), 5.29 (1H, dt, J=11.1 Hz, 7.3 Hz), 5.33-5.41 (2H, m), 5.70 (1H, dt, J=14.9 Hz, 6.5 Hz), 5.96 (1H, dd, J=11.1 Hz, 11.1 Hz), 6.29 (1H, dddt, J=15.0 Hz, 11.1 Hz, 1.5 Hz, 1.5 Hz), 9.75 (1H, t, J=1.9 Hz); $^{13}$C-NMR (500 MHz, CDCl$_3$): δ=13.58, 21.94, 25.84, 26.98, 27.31, 27.75, 28.74, 29.36, 43.83, 124.55, 128.96, 129.14, 129.25, 129.99, 136.41, 202.72.

Mass spectrum: EI-mass spectrum (70 eV): m/z 234 (M$^+$), 149, 135, 122, 107, 95, 79, 67, 55, 41.

Infrared absorption spectrum (D-ATR): νmax=2962, 2931, 2856, 1727, 1460, 983, 947, 739.

Example 10: Preparation of (7Z,11Z,13E)-7,11,13-hexadecatrienal (7)

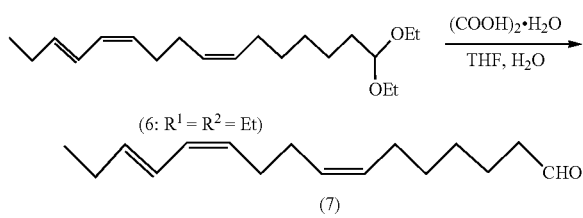

(3E,5Z,9Z)-16,16-diethoxy-3,5,9-hexadecatriene (6: $R^1=R=$Et) (375.58 g, 0.91 mol, purity 74.36%, 3E5Z9Z:3E5E9Z=87.4:12.6) (containing (7Z,11Z,13E)-1-ethoxy-1,7,11,13-hexadecatetraene (0.037 mol, content 2.6%) as an impurity) obtained in Example 6, oxalic acid dihydrate (356.53 g, 2.83 mol), tetrahydrofuran (942.67 g), and pure water (942.67 g) were placed in a reactor and stirred at 60 to 65° C. for 2 hours. The reaction mixture was cooled to 50° C., and hexane (277.24 g) was added. The mixture was stirred for 30 minutes. After the completion of the stirring, the reaction mixture was left to stand for phase separation, followed by removal of the aqueous phase to obtain the organic phase. The organic phase was concentrated at a reduced pressure, and the concentrate was distilled at a reduced pressure (125.0 to 134.5° C./0.40 kPa (3.0 mmHg)) to obtain (7Z,11Z,13E)-7,11,13-hexadecatrienal (7) (221.37 g, 0.90 mol, purity 94.79%, 7Z11Z13E:7Z11E13E=86.6:13.4) in an overall yield of Examples 6 and 10 of 72.20%. It should be noted that (7Z,11Z,13E)-1-ethoxy-1,7,11,13-hexadecatetraene was also hydrolyzed to form (7Z,11Z,13E)-7,11,13-hexadecatrienal (7). (7Z,11Z,13E)-7,11,13-hexadecatrienal (7) was prepared from the starting material, 1-bromo-5-chloro-1-pentyne (16: $X^1=$Cl, $X^2=$Br), in a total overall yield through Examples 2, 4, 6, and 10 of 55.83%.

The spectrum data of (7Z,11Z,13E)-7,11,13-hexadecatrienal (7) thus prepared were same as those determined in Example 9.

Example 11: Preparation of (7Z,11Z)-7,11-hexadecadienal (10)

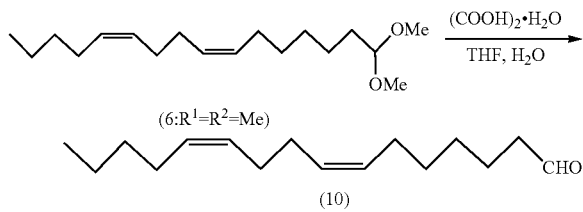

The crude product (5Z,9Z)-16,16-dimethoxy-5,9-hexadecadiene (9: $R^1=R^2$Me) obtained in Example 7 (117.29 g, 0.38 mol, purity 90.59%, the 5Z9Z-form and the 5E9Z-form were not separated by GC), oxalic acid dihydrate (150.19 g, 1.19 mol), tetrahydrofuran (397.10 g), and pure water (397.10 g) were placed in a reactor and stirred at 60 to 65° C. for 3 hours. The reaction mixture was cooled to 50° C., and hexane (116.79 g) was added. The mixture was stirred for 30 minutes. After the completion of the stirring, the reaction mixture was left to stand for phase separation, followed by removal of the aqueous phase to obtain the organic phase. The organic phase was concentrated at a reduced pressure, and the concentrate was distilled at a reduced pressure (110.4 to 130.6° C./0.40 kPa (3.0 mmHg)) to obtain (7Z,11Z)-7,11-hexadecadienal (10) (87.73 g, 0.35 mol, purity 93.90%, 7Z11Z:7Z11E=94.7:5.3) in an overall yield of Examples 7 and 10 of 87.13%. (7Z,11Z)-7,11-hexadecadienal (10) was prepared from the starting material, 1-bromo-5-chloro-1-pentyne (16: $X^1$=Cl, $X^2$=Br), in an overall yield through Examples 1, 3, 7, and 11 of 72.79%.

The following are spectrum data of (7Z,11Z)-7,11-hexadecadienal (10) thus prepared.

Nuclear magnetic resonance spectrum: $^1$H-NMR (500 MHz, CDCl$_3$): δ=0.89 (3H, t, J=7.3 Hz), 1.25-1.39 (8H, m), 1.63 (2H, tt, J=7.3 Hz, 7.3 Hz), 2.02 (4H, quin-like, J=6.2 Hz), 2.07 (4H, t, J=2.7 Hz), 2.41 (2H, dt, J=1.9 Hz, 7.3 Hz), 5.31-5.41 (4H, m), 9.76 (1H, tJ=1.9 Hz); $^{13}$C-NMR (500 MHz, CDCl$_3$): δ=13.96, 21.95, 22.31, 26.92, 26.96, 27.31, 27.39, 28.75, 29.38, 31.88, 43.84, 129.02, 129.51, 129.79, 130.35, 202.74.

Mass spectrum: EI-mass spectrum (70 eV): m/z 236 (M$^+$), 218, 193, 137, 123, 109, 95, 81, 67, 55, 41.

Infrared absorption spectrum (D-ATR): νmax=2928, 2857, 2715, 1728, 1458, 727.

Example 12: Preparation of a Mixture (13) of (7Z,11Z,13E)-7,11,13-hexadecatrienal (7) and (7Z,11Z)-7,11-hexadecadienal (10)

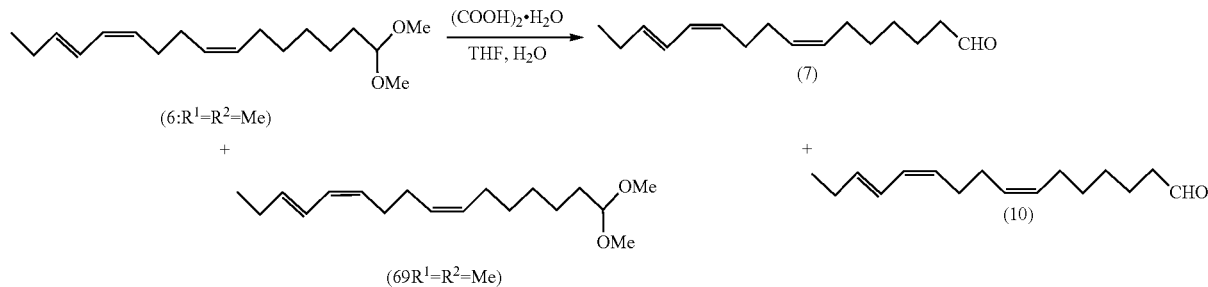 [SMILES: CC/C=C/C=C\CC/C=C\CCCCCC(OC)OC ; CC/C=C/C=C\CC/C=C\CCCCCC=O ; CC/C=C/C=C\CC/C=C\CCCCCC(OC)OC ; CC/C=C/C=C\CC/C=C\CCCCCC=O]

The mixture (12) obtained in Example 8 of (3E,5Z,9Z)-16,16-dimethoxy-3,5,9-hexadecatriene (6: $R^1$=$R^2$=Me) (40.84 g, 0.092 mol, content 63.06%, 3E5Z9Z:3E5E9Z=90.9:9.1) and (5Z,9Z)-16,16-dimethoxy-5,9-hexadecadiene (9: $R^1$=$R^2$=Me) (40.84 g, 0.30 mol, content 20.59%, the 5Z9Z-form and the 5E9Z-form were not separated by GC), oxalic acid dihydrate (45.99 g, 0.36 mol), tetrahydrofuran (121.60 g), and pure water (121.60 g) were placed in a reactor and stirred at 60 to 65° C. for 3 hours. The reaction mixture was cooled to 50° C., and hexane (35.76 g) was added. The mixture was stirred for 30 minutes. After the completion of the stirring, the reaction mixture was left to stand for phase separation, followed by removal of the aqueous phase to obtain the organic phase. The organic phase was concentrated at a reduced pressure, and the concentrate was distilled at a reduced pressure (110.4 to 123.0° C./0.40 kPa (3.0 mmHg)) to obtain a mixture (13) of (7Z,11Z,13E)-7,11,13-hexadecatrienal (7) (24.42 g, 0.078 mol, content 75.23%, 7Z11Z13E: 7Z11E13E=90.6:9.4) and (7Z,11Z)-7,11-hexadecadienal (10) (24.42 g, 0.023 mol, content 21.83%, 7Z11Z:7Z11E=94.3:5.7) in an overall yield of Examples 8 and 12 of 75.37%.

The spectrum data of (7Z,11Z,13E)-7,11,13-hexadecatrienal (7) and (7Z,11Z)-7,11-hexadecadienal (10) thus prepared were same as those determined in Example 9 and Example 11, respectively.

The invention claimed is:

1. A process for preparing a (4Z)-11,11-dialkoxy-4-undecenyltriarylphosphonium halide compound of the following general formula (3-Z):

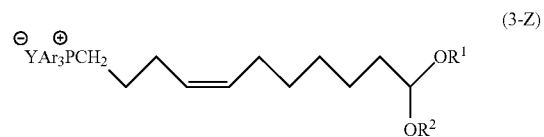

wherein Y represents a halogen atom, Ar represents, independently of each other, an aryl group, and $R^1$ and $R^2$ represent, independently of each other, a monovalent hydrocarbon group having 1 to 15 carbon atoms, or $R^1$ and $R^2$ may form together a divalent hydrocarbon group, $R^1$-$R^2$, having 2 to 10 carbon atoms, the process comprising:

subjecting a (7Z)-11-halo-1,1-dialkoxy-7-undecene compound of the following general formula (1-Z):

wherein $X^1$ represents a halogen atom, and $R^1$ and $R^2$ are as defined above, to a phosphonium salt formation reaction with a phosphine compound of the following general formula (2):

wherein Ar is as defined above to form the (4Z)-11,11-dialkoxy-4-undecenyltriarylphosphonium halide compound (3-Z).

2. A process for preparing a (3E,5Z,9Z)-16,16-dialkoxy-3,5,9-hexadecatriene compound of the following formula (6):

(6)

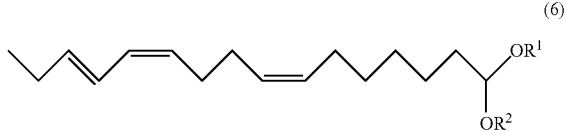

wherein R¹ and R² represent, independently of each other, a monovalent hydrocarbon group having 1 to 15 carbon atoms, or R¹ and R² may form together a divalent hydrocarbon group, R¹-R², having 2 to 10 carbon atoms,
the process comprising:
 the process according to claim 1 for preparing the (4Z)-11,11-dialkoxy-4-undecenyltriarylphosphonium halide compound (3-Z),
 deprotonating the (4Z)-11,11-dialkoxy-4-undecenyltriarylphosphonium halide compound (3-Z) in the presence of a base to form a reaction product mixture, and
 subjecting the reaction product mixture to a Wittig reaction with (2E)-2-pentenal of the following formula (5):

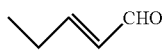 (5)

to form the (3E,5Z,9Z)-16,16-dialkoxy-3,5,9-hexadecatriene compound (6).

3. A process for preparing a (7Z,11Z,13E)-7,11,13-hexadecatrienal of the following formula (7):

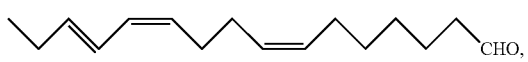 (7)

the process comprising:
 the process according to claim 2 for preparing the (3E,5Z,9Z)-16,16-dialkoxy-3,5,9-hexadecatriene compound (6), and
 hydrolyzing the (3E,5Z,9Z)-16,16-dialkoxy-3,5,9-hexadecatriene compound (6) to form (7Z,11Z,13E)-7,11,13-hexadecatrienal (7).

4. A process for preparing a (5Z,9Z)-16,16-dialkoxy-5,9-hexadecadiene compound of the following general formula (9):

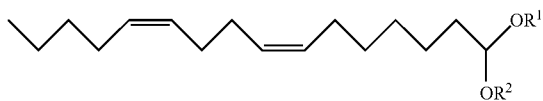 (9)

wherein R¹ and R² represent, independently of each other, a monovalent hydrocarbon group having 1 to 15 carbon atoms, or R¹ and R² may form together a divalent hydrocarbon group, R¹-R², having 2 to 10 carbon atoms,
the process comprising:
 the process according to claim 1 for preparing the (4Z)-11,11-dialkoxy-4-undecenyltriarylphosphonium halide compound (3-Z),
 deprotonating the (4Z)-11,11-dialkoxy-4-undecenyltriarylphosphonium halide compound (3-Z) in the presence of a base to form a reaction product mixture, and
 subjecting the reaction product mixture to a Wittig reaction with pentanal of the following formula (8):

$CH_3(CH_2)_3CHO$ (8)

to form the (5Z,9Z)-16,16-dialkoxy-5,9-hexadecadiene compound (9).

5. A process for preparing (7Z,11Z)-7,11-hexadecadienal of the following formula (10):

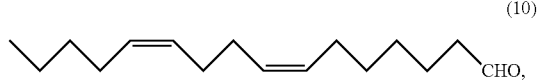 [SMILES: CCCC/C=C\CC/C=C\CCCCCC=O] (10)

the process comprising:
 the process according to claim 4 for preparing the (5Z,9Z)-16,16-dialkoxy-5,9-hexadecadiene compound (9), and
 hydrolyzing the (5Z,9Z)-16,16-dialkoxy-5,9-hexadecadiene compound (9) to form (7Z,11Z)-7,11-hexadecadienal (10).

6. A process for preparing a mixture comprising a (3E,5Z,9Z)-16,16-dialkoxy-3,5,9-hexadecatriene compound of the following general formula (6):

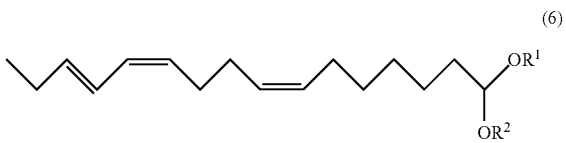 (6)

wherein R¹ and R² represent, independently of each other, a monovalent hydrocarbon group having 1 to 15 carbon atoms, or R¹ and R² may form together a divalent hydrocarbon group, R¹-R², having 2 to 10 carbon atoms,
and a (5Z,9Z)-16,16-dialkoxy-5,9-hexadecadiene compound of the following general formula (9):

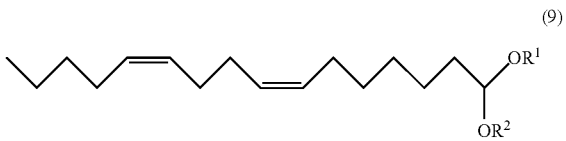 (9)

wherein R¹ and R² are as defined above,
the process comprising:
 the process according to claim 1 for preparing the (4Z)-11,11-dialkoxy-4-undecenyltriarylphosphonium halide compound (3-Z),
 deprotonating the (4Z)-11,11-dialkoxy-4-undecenyltriarylphosphonium halide compound (3-Z) in the presence of a base to form a reaction product mixture, and
 subjecting the reaction product mixture to a Wittig reaction with (2E)-2-pentenal of the following formula (5):

 (5)

and with pentanal of the following formula (8):

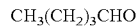
$CH_3(CH_2)_3CHO$ (8)

to form the mixture comprising the (3E,5Z,9Z)-16,16-dialkoxy-3,5,9-hexadecatriene compound (6) and the (5Z,9Z)-16,16-dialkoxy-5,9-hexadecadiene compound (9).

7. A process for preparing a mixture comprising (7Z,11Z,13E)-7,11,13-hexadecatrienal of the following formula (7):

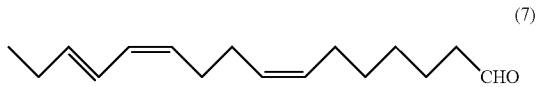 [SMILES: CC/C=C/C=C\CC/C=C\CCCCCC=O]
(7)

and (7Z,11Z)-7,11-hexadecadienal of the following formula (10):

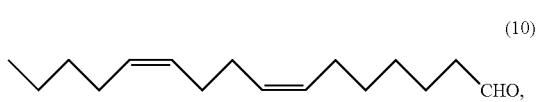 [SMILES: CCCC/C=C\CC/C=C\CCCCCC=O]
(10)

the process comprising:
the process according to claim 6 for preparing the mixture comprising the (3E,5Z,9Z)-16,16-dialkoxy-3,5,9-hexadecatriene compound (6) and the (5Z,9Z)-16,16-dialkoxy-5,9-hexadecadiene compound (9), and
subjecting the mixture comprising the (3E,5Z,9Z)-16,16-dialkoxy-3,5,9-hexadecatriene compound (6) and the (5Z,9Z)-16,16-dialkoxy-5,9-hexadecadiene compound (9) to a hydrolysis reaction condition to form a mixture comprising (7Z,11Z,13E)-7,11,13-hexadecatrienal (7) and (7Z,11Z)-7,11-hexadecadienal (10).

8. A process for preparing a (3E,5Z,9Z)-16,16-dialkoxy-3,5,9-hexadecatriene compound of the following general formula (6):

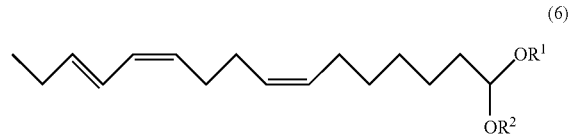
(6)

wherein $R^1$ and $R^2$ represent, independently of each other, a monovalent hydrocarbon group having 1 to 15 carbon atoms, or $R^1$ and $R^2$ may form together a divalent hydrocarbon group, $R^1$-$R^2$, having 2 to 10 carbon atoms,
the process comprising:
deprotonating a (4Z)-11,11-dialkoxy-4-undecenyltriarylphosphonium halide compound (3-Z) of the following general formula (3-Z):

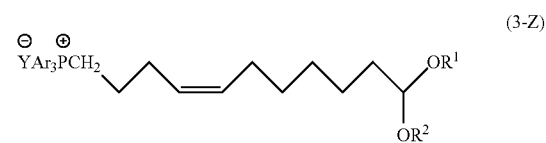
(3-Z)

wherein Y represents a halogen atom, Ar represents, independently of each other, an aryl group, and $R^1$ and $R^2$ are as defined above,
in the presence of a base to form a reaction product mixture, and
subjecting the reaction product mixture to a Wittig reaction with (2E)-2-pentenal of the following formula (5):

(5)

to form the (3E,5Z,9Z)-16,16-dialkoxy-3,5,9-hexadecatriene compound (6).

9. A process for preparing a (7Z,11Z,13E)-7,11,13-hexadecatrienal of the following general formula (7):

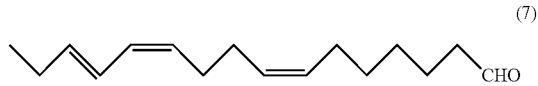
(7)

the process comprising:
the process according to claim 8 for preparing the (3E,5Z,9Z)-16,16-dialkoxy-3,5,9-hexadecatriene compound (6), and
hydrolyzing the (3E,5Z,9Z)-16,16-dialkoxy-3,5,9-hexadecatriene compound (6) to form (7Z,11Z,13E)-7,11,13-hexadecatrienal (7).

* * * * *